US012394012B2

(12) United States Patent
Feng et al.

(10) Patent No.: US 12,394,012 B2
(45) Date of Patent: Aug. 19, 2025

(54) SYSTEMS, METHODS, AND APPARATUS FOR ALIGNING IMAGE FRAMES

(71) Applicant: Waymo LLC, Mountain View, CA (US)

(72) Inventors: Jia Feng, Mountain View, CA (US); Lucian Ion, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 994 days.

(21) Appl. No.: 17/490,991

(22) Filed: Sep. 30, 2021

(65) Prior Publication Data

US 2023/0097592 A1 Mar. 30, 2023

(51) Int. Cl.
*G06T 3/40* (2024.01)
*G06T 7/33* (2017.01)
(Continued)

(52) U.S. Cl.
CPC ............... *G06T 3/40* (2013.01); *G06T 7/337* (2017.01); *G06V 10/22* (2022.01); *G06V 10/751* (2022.01); *G06T 2207/20016* (2013.01)

(58) Field of Classification Search
CPC . G06T 2207/20016; G06T 7/337; G06T 3/40; G06V 10/751; G06V 10/22; G06V 10/62
See application file for complete search history.

(56) References Cited

U.S. PATENT DOCUMENTS

| 8,478,076 B2 | 7/2013 | Mathew |
| 9,609,217 B2 | 3/2017 | Ju et al. |

(Continued)

FOREIGN PATENT DOCUMENTS

| CN | 110930440 A | 3/2020 |
| CN | 111353948 A | 6/2020 |

(Continued)

OTHER PUBLICATIONS

Sheikh et al., "An accumulative framework for the alignment of an image sequence", Conference Paper, Proceedings of Asian Conference on Computer Vision (ACCV '04), Jan. 2004.

(Continued)

*Primary Examiner* — Margaret G Webb
(74) *Attorney, Agent, or Firm* — MCDONNELL BOEHNEN HULBERT & BERGHOFF LLP

(57) ABSTRACT

Described examples relate to an apparatus comprising a memory for storing image frames and at least one processor. The at least one processor may be configured to receive a plurality of image frames from an image capture device and downsize each of the plurality image frames to generate a plurality of versions of each image frame at a plurality of different sizes. The at least one processor may also be configured to determine alignment information for a first version of a first image frame. The alignment information may include a first alignment vector for identifying image data in a first version of a second image frame that corresponds to image data in the first version of the first image frame. Further, the at least one processor may be configured to determine a first initial alignment vector for identifying image data in a first version of a third image frame based on at least the first alignment vector.

20 Claims, 9 Drawing Sheets

(51) Int. Cl.
*G06V 10/22* (2022.01)
*G06V 10/75* (2022.01)

(56) References Cited

U.S. PATENT DOCUMENTS

| | | | |
|---|---|---|---|
| 9,628,718 B2 | 4/2017 | Campbell et al. | |
| 10,645,290 B2 | 5/2020 | Besley et al. | |
| 10,853,928 B2 | 12/2020 | Smirnov et al. | |
| 10,867,370 B2 | 12/2020 | Ferres et al. | |
| 2006/0018381 A1 | 1/2006 | Luo et al. | |
| 2011/0134315 A1 | 6/2011 | Levy et al. | |
| 2012/0002890 A1* | 1/2012 | Mathew | H04N 23/683 382/232 |
| 2012/0206618 A1* | 8/2012 | Albu | H04N 23/698 348/222.1 |
| 2015/0324660 A1 | 11/2015 | Stein et al. | |
| 2020/0356827 A1* | 11/2020 | Dinerstein | G06N 3/08 |
| 2021/0142463 A1* | 5/2021 | Amirghodsi | G06T 7/337 |
| 2021/0166354 A1* | 6/2021 | Veit | G06T 5/70 |
| 2021/0377466 A1* | 12/2021 | Francois | G06T 3/4007 |

FOREIGN PATENT DOCUMENTS

| | | |
|---|---|---|
| CN | 110913143 B | 4/2021 |
| KR | 2018047161 A | 5/2018 |
| WO | 2020220517 A1 | 11/2020 |

OTHER PUBLICATIONS

Caspi et al., "A step towards sequence-to-sequence alignment", Proceedings IEEE Conference on Computer Vision and Pattern Recognition, CVPR 2000 (Cat. No. PR00662), Jun. 15, 2000.

Chalidabhongse et al., "Fast Motion Vector Estimation Using Multiresolution-Spatio Temporal Correlations", IEEE Transactions on Circuits and Systems for Video Technology, vol. 7, No. 3, Jun. 1, 1997, pp. 477-488.

* cited by examiner

SYSTEMS, METHODS, AND APPARATUS FOR ALIGNING IMAGE FRAMES

BACKGROUND

This background description is provided for the purpose of generally presenting the context of the disclosure. Unless otherwise indicated herein, material described in this section is neither expressly nor impliedly admitted to be prior art to the present disclosure or the appended claims.

An autonomous vehicle or autonomously driven vehicle (ADV) may navigate a path of travel using information about the environment obtained by sensors of the vehicle. The autonomous vehicle may be equipped with various types of sensors in order to detect the environment surrounding the vehicle. For example, the autonomously driven vehicle may include light detection and ranging (lidar) sensors, radio detection and ranging (radar) sensors, sound navigation and ranging (sonar) sensors, image capture devices (e.g., cameras), microphone sensors, and other suitable sensors that scan, generate and/or record data about the vehicle's surroundings.

A computing system of the vehicle may receive and process the information provided by the vehicle sensors in order to avoid objects and to navigate paths of travel in accordance with traffic regulations. The computing system may use the information received from the vehicle sensors to detect objects within the environment of the vehicle. For example, image data from an image capture device (e.g., a camera or image sensor) may be used by the computing system to detect objects in a scene. The computing system may also determine the location and movement of the objects in the environment.

In determining movement of the objects in the environment surrounding the vehicle, the computing system may perform motion estimation techniques to determine changes of the image data between the captured image frames (e.g., images). However, the captured image frames may contain a large amount of data (e.g., relatively high resolution images). Thus, it may require a significant amount of computing resources for processing the image data. Further, it may be time consuming to perform motion estimation techniques using the original image frames to determine changes of the image data in the image frames.

SUMMARY

The present application discloses embodiments that relate to systems, methods, and apparatus that improve image processing functions of a computing system of a vehicle, such as an autonomously driven vehicle. The computing system may receive a sequence of image frames from an image capture device (e.g., camera) and may derive alignment information from the image frames in an effective and timely manner. The computing systems may transform the image frames to smaller sizes or lower resolutions to reduce computation load. The image frames may be reduced in size or resolution by downsizing or down-sampling the image data of the image frames into one or more versions of each image frame (e.g., downsized image frames).

The computing system may determine alignment information between the smaller sized or lower resolution image frames and use the alignment information to align the image data of the larger sized or higher resolution image frames. Thus, the efficacy of image alignment may be improved and computation complexity may be reduced. As a result, the computing systems may perform image processing at faster speeds and potential processing latencies may be reduced. Further, the computing system may be able to compute more accurate alignment vectors under a given requirement on processing speed and latency, which may result in better image quality (e.g., improved signal-to-noise ratio) after the aligned image data from one or more image frames is merged with corresponding image data in another image frame (e.g., a base frame). Thus, the accuracy of detecting changes or movements of image data (e.g., objects) between image frames may be improved.

In one aspect, the present application describes a method. The method may comprise receiving a plurality of image frames from an image capture device and downsizing each of the plurality of image frames to generate a plurality of versions of each image frame at a plurality of different sizes. The method may also include determining alignment information for a first version of a first image frame. The alignment information may include a first alignment vector for identifying image data in a first version of a second image frame that corresponds to image data in the first version of the first image frame. Further, the method may include determining a first initial alignment vector for identifying image data in a first version of a third image frame based on at least the first alignment vector.

In another aspect, the present application describes an apparatus comprising a memory for storing image frames and at least one processor. The at least one processor may be configured to receive a plurality of image frames from an image capture device and downsize each of the plurality of image frames to generate a plurality of versions of each image frame at a plurality of different sizes. The at least one processor may also be configured to determine alignment information for a first version of a first image frame. The alignment information may include a first alignment vector for identifying image data in a first version of a second image frame that corresponds to image data in the first version of the first image frame. Further, the at least one processor may be configured to determine a first initial alignment vector for identifying image data in a first version of a third image frame based on at least the first alignment vector.

In still another aspect, a non-transitory computer-readable medium storing instructions is disclosed that, when the instructions are executed by one or more processors, causes the one or more processors to perform operations. The operations may include receiving a plurality of image frames from an image capture device and downsizing each of the plurality of image frames to generate a plurality of versions of each image frame at a plurality of different sizes. The operations may also include determining alignment information for a first version of a first image frame. The alignment information may include a first alignment vector for identifying image data in a first version of a second image frame that corresponds to image data in the first version of the first image frame. Further, the operations may include determining a first initial alignment vector for identifying image data in a first version of a third image frame based on at least the first alignment vector.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
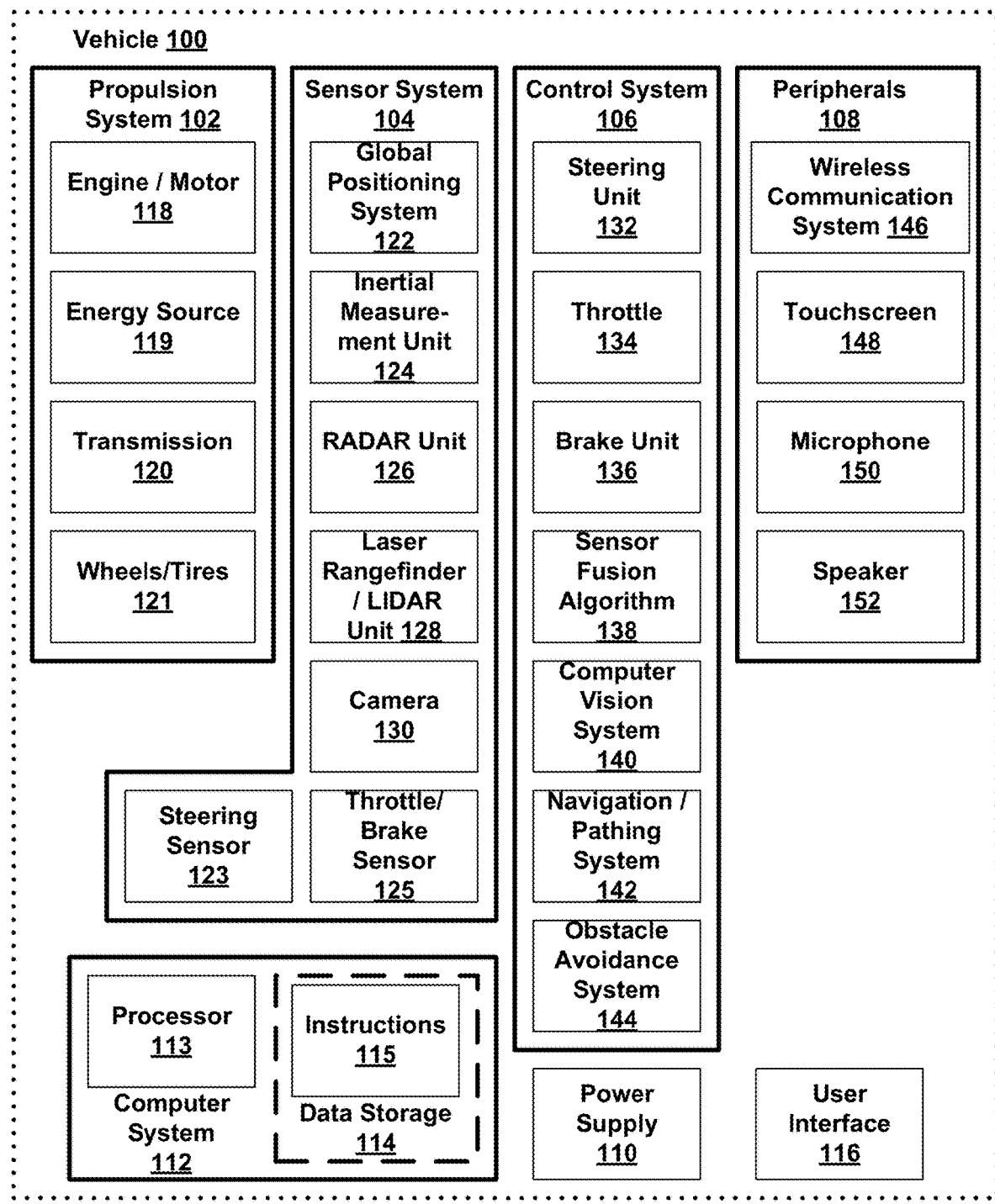
FIG. 1 is a functional block diagram illustrating systems of a vehicle, according to an example implementation.

The following detailed description describes various features and functions of the illustrative systems, methods, and apparatus with reference to the accompanying figures. The systems, methods, and apparatus described herein are not meant to be limiting. It may be readily understood that certain aspects of the illustrative systems, methods, and apparatus can be arranged and combined in a wide variety of different configurations, all of which are contemplated herein. Thus, other embodiments can be utilized and other changes can be made without departing from the scope of the subject matter presented herein.

Further, unless context suggests otherwise the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Further, wherever practicable, similar or like reference numbers may be used in the figures and may indicate similar or like elements or functionality. Unless otherwise noted, figures are not drawn to scale.

The present application discloses embodiments that relate to systems, methods, and apparatus that improve image processing functions of a computing system of a vehicle, such as an autonomously driven vehicle, autonomous vehicle, driverless vehicle, or self-driving car. The computing system may receive a sequence of image frames from an image capture device (e.g., camera) and may derive alignment information from the image frames in an effective and timely manner. The computing system may transform the image frames to smaller sizes or lower resolutions to reduce computation load. The image frames may be reduced in size or resolution by downsizing or down-sampling the image data of the image frames into one or more versions of each image frame (e.g., downsized image frames).

The computing system may determine alignment information between the smaller sized or lower resolution image frames and use the alignment information to align the image data of the larger sized or higher resolution image frames.

Thus, the efficacy of image alignment may be improved and computation complexity may be reduced. As a result, the computing systems may perform image processing at faster speeds and potential processing latencies may be reduced. Further, the computing system may be able to compute more accurate alignment vectors under a given requirement on processing speed and latency, which may result in better image quality (e.g., improved signal-to-noise ratio) after the aligned image data from one or more image frames is merged with corresponding image data in another image frame (e.g., a base frame). Thus, the accuracy of detecting changes or movements of image data (e.g., objects) between image frames may be improved.

Autonomous vehicles may navigate a path of travel without requiring a driver to provide guidance and control. In order to obey traffic regulations and avoid objects or obstacles in the environment, the vehicle may utilize data provided by a vehicle sensor system equipped with one or multiple types of sensors. For example, the sensors may include light detection and ranging (lidar) sensors, radio detection and ranging (radar) sensors, sound navigation and ranging (sonar) sensors, image capture devices (e.g., cameras), microphone sensors, and other suitable sensors.

As the vehicle navigates, the sensors of the vehicle sensor system may be configured to capture sensor information (e.g., measurements) indicative of the vehicle's environment and provide the sensor information periodically or in a continuous manner to a computing device of the vehicle sensor system. The sensors may provide the sensor information in various formats to the computing device. For example, the computing device may receive the sensor information in the form of sensor data frames. Each of the sensor data frames may include one or multiple measurements of the environment captured at a particular time during the operation of the sensors. Further, the sensors may provide multiple sensor data frames (e.g., a sequence or series of sensor frames) to the computing device as the vehicle operates, which may reflect changes in the environment.

The sensor system of the vehicle may include an image capture device (e.g., an image sensor or camera) configured to capture a sequence of image frames (e.g., images) of a scene or an environment. The image capture device may include a plurality of pixels or sensing elements configured in horizontal rows and/or vertical columns. The pixels of the image captured device may be sampled to obtain pixel values or image data for constructing an image frame (e.g., an image). In some examples, the image capture device may have a rolling shutter configured to iteratively sample or scan the vertical columns and/or horizontal rows of the pixels. Once the image capture device captures the image data from the pixels, the image data may be stored in memory. The number of image frames (e.g., images) captured by the image capture device and the arrangement of the exposure times used to capture the images may be referred to as a payload burst or a burst sequence.

The computing device may determine information about the environment or scene using the image data of the image frames. Within the sequence of image frames, the initial image frame may include image data that corresponds to the environment at a first time period. Similarly, the second image frame of the sequence may include image data that corresponds to the environment at a second time period, which could be either after or before the first time period. Thus, each image frame may be indicative of the environment at a particular time period when the image capture device captures the image data associated with the image frame. Further, the image frames may include matching or similar information about the environment (e.g., objects) depending on the amount of time that passes between the capture of the image data by the image capture device.

In some implementations, image data of a sequence of image frames may be combined or reconstructed by the computing device into one or more output or composite image frames (e.g., merged frames). For example, the computing device may combine or merge two or more image frames of the sequence of image frames into a single output image frame. Combining the image frames into an output image frame may improve the signal-to-noise ratio (SNR) of and achieve a higher dynamic range (HDR) within the resulting output image frame (e.g., a high dynamic range (HDR) image frame). The computing device may use the output image frame to make determinations about the location and identity of objects in the surrounding scene or environment. The objects may be, for example, other vehicles or road users like cyclists and pedestrians, animals crossing the road, debris, temporary objects placed in the road like trash bins or cones, or permanent objects like road infrastructure.

Combining the image data of the image frames to form the output image frames may include performing one or more image processing techniques on the sequence of image frames (e.g., based on spatial or temporal information within the sequence of frames). The image processing techniques may include selecting a base or key image frame (e.g., a base image) from the sequence of image frames (e.g., images). The base frame may be selected or identified based on an aspect of an image, an aspect of the image capture device, and/or an aspect of a vehicle. In some examples, the base image frame may be selected from the image frames based on the capture or sampling times of the image capture device and/or the orientation of the image capture device relative to the vehicle or environment. For example, the computing device may select the image frame that is closest in time to a desired sample time or the last image frame in the sequence of image frames as the base image frame. In other examples, the computing device may select the base image frame from the sequence of image frames by identifying the image frame with the greatest sharpness, most contrast, and/or other image metric; or the image frame that was captured during the least amount of motion (e.g., based on metadata associated with each of the image frames and/or other data about the vehicles existing or planned motions); the image frame that was captured when the vehicle was at a certain location (e.g. a location with known static objects or known lighting conditions or known changes to lighting conditions); or the image frame that was capture when another vehicle sensor was in a certain state, e.g., a certain operating and/or orientation state.

After the computing device selects the base image frame, the computing device may select one or more of the remaining image frames in the sequence of image frames to combine with the base image frame. The remaining image frames may be referred to as alternative or reference image frames (e.g., adjacent image frames). For example, the computing device may be configured to combine one or more portions of the base image frame with one or more portions of the alternative image frames.

In order to combine image data from different image frames, the computing device may perform hierarchical motion estimation processes to align the image data of the base image frame with the image data of one or more alternative image frames. The computing device may identify changes or movements in the image data that occur between the base and alternative image frames (e.g., adjacent or temporal image frames) due to local or global motion. For example, the image data of the image frames may change from image frame to image frame due to movement of objects in the scene (e.g., a moving pedestrian) and/or movement of the image capture device capturing the scene. The computing device may identify corresponding or similar (e.g., substantially matching) image data between the base and alternative image frames. For example, the computing device may select image data of one or more portions of the base image frame and may determine the image data of the alternative frames that corresponds or is similar to the image data of the base image frame.

In some implementations, the computing device may utilize tile-based (e.g., block-based) motion estimation to determine corresponding or similar image data between the base and alternative image frames. The computing device may divide or partition the base and the alternative image frame into a plurality of non-overlapping, equal-sized tiles or blocks. The computing device may select a tile in the base image frame and may identify tile-size portions or areas (e.g., a tile or block size area) in the alternative image frames. The computing device may compare the image data of the selected tile in the base image frame to the image data of the tile-size areas in the alternative image frames. Based on the comparisons, the computing device may identify a portion or a tile sized area (e.g., a matching patch or area) in each alternative image frame having similar or substantially matching image data as the image data of the selected tile in the base image frame. In some examples, the computing device may identify a number of candidate matching patches in the alternative image frames that may correspond to the selected tile in the base image frame. The computing device may identify or select one of the candidate matching patches to represent the most similar or best matching patch (e.g., the matching patch) for the selected tile of the base image frame.

Once the matching patches are determined in the alternative image frames, the computing device may determine alignment vectors to identify the matching patches in the alternative image frames from the selected tiles in the based image frame. The alignment vectors may represent the motion (temporal and spatial displacement) between the base image frame and the alternative image frames. In some implementations, the alignment vectors may identify co-located tiles in the alternative image frames and offsets of the matching patches from the co-located tiles in the alternative image frames. Using the alignment vectors, the computing device may align the image data of the matching patches in the alternative image frames with the corresponding image data of the selected tiles in the base image frame.

Since the base and alternative images frames typically have a relatively high resolution or a large size, it may be time consuming and require significant processing resources to perform motion estimation and/or alignment techniques on the original base and alternative image frames to align and combine the image frames. In order to decrease the required amount of computations and computational costs to align the base and alternative images frames, image pyramid motion estimation techniques may be used to perform motion estimation between downsized or down-sampled versions of the base and alternative image frames to align the image data of the alternative image frames with the image data or the base image frame. The image pyramid techniques may increase the speed of image processing by reducing the size or resolutions of the image frames to be processed while maintaining the properties of the image frames. Further, the accuracy of the alignment vectors for identifying corresponding or similar image data between the base image frame and the alternative image frames may be improved.

The computing device may transform or change the size or resolution of the original base and alternative image frames captured by an image capture device, such as downsize, upsize, down-sample and/or up-sample, etc. the image frames. In some implementations, the computing device may down-sample or downsize the image data of each of the original base and alternative image frames into multiple different versions or variations. The different versions of the image frames generated from the original base and alternative image frames may be arranged in a multi-level image pyramid. Each multi-level image pyramid may include multiple images having different sizes or resolutions (e.g., downsized image frames) on each level. For example, the base and alternative image frames may be reduced in size by downsizing or down-sampling the image data of the base and alternative image frames into one or more versions of the base image frame and one or more versions of each alternative image frame. Further, the computing device may downsize or down-sample the image frames according to predetermined ratios. The image frames may be downsized or down-sampled in resolution or size a fixed number of times or a variable number of times depending on the size and resolution of the original image frames.

Once the base and alternative image frames are downsized or down-sampled into one or more versions of the base and alternative image frames, the computing device may compare the image data of each version of the base frame image to the image data of the associated or respective version of the alternative image frames. Based on the comparisons, the computing device may identify portions or tile sized areas (e.g., matching patches or areas) of image data in each version of the alternative image frames that correspond or are similar to (e.g., substantially match) image data of a selected tile or portion in the associated version of the base image frame.

Once the matching patches or portions are identified in each version of the alternative image frames, the computing device may generate alignment information between the base image frame and each alternative image frame. For example, the computing device may generate alignment vectors for each of the plurality of levels of the image pyramids in the order from an uppermost level to a lowermost level of the image pyramids. The alignment vectors may identify the matching patch in each version of the alternative image frames that corresponds to the image data of a selected tile or portion in an associated version of the base image frame. The alignment vectors may be two-dimensional vectors and may have a horizontal component value and a vertical component value. In some implementations, the alignment vectors may represent offsets between the matching patches and one or more tiles or portions in a version of an alternative image frame that are co-located (e.g., in the same position) with the selected tiles in the associated version of the base image frame.

The alignment vectors between the image frames of the higher levels of the image pyramids may be upscaled or upsized for use in an immediate or direct lower level. For example, the alignment vectors computed in a level may be used (with up-sampling) as initial alignment vectors (e.g., predicted vectors) to identify locations in each associated version of the alternative image frames in an immediate lower level to begin a search for image data that may correspond or be similar to the image data of an associated version of the base image frame. In the lowest level, alignment vectors may be computed between the base image frame and the alternative image frames using an upsized version of the alignment vectors computed between smaller sized versions of the base and alternative image frames in an immediate higher level. Further, the alignment vectors may be computed between the base and alternative image frames in the lowest level using alignment vectors computed between the base image frame and preceding alternative image frames. Using these alignment vectors, the computing device may align the image data of the base image frame with the corresponding image data (e.g., matching patches) of the alternative image frames. Since the alignment vectors determined between the smaller sized image frames may be used to determine alignment vectors between the larger sized image frames, image alignment efficiency may be improved and computation complexity may be reduced accordingly.

Once the alignment vectors between the base image frame and the alternate image frames are determined, the computing device may combine the image data of one or more of the alternative image frames with the image data of the base image frame. For example, the computing device may combine the image data of the matching patches of the alternative image frames with the image data of the tiles in the base image frame. Combining the image data of the alternative image frames with the base image frames using image pyramid processing techniques may improve the signal-to-noise ratio (SNR) of and achieve a high dynamic range within the resulting payload or output image frame (e.g., a high-dynamic range (HDR) image).

Example systems, apparatus, and methods that implement the techniques described herein will now be described in greater detail with reference to the figures. Generally, an example system may be implemented in or may take the form of a sensor or computer system of an automobile or a vehicle. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., 02 monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal.

The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
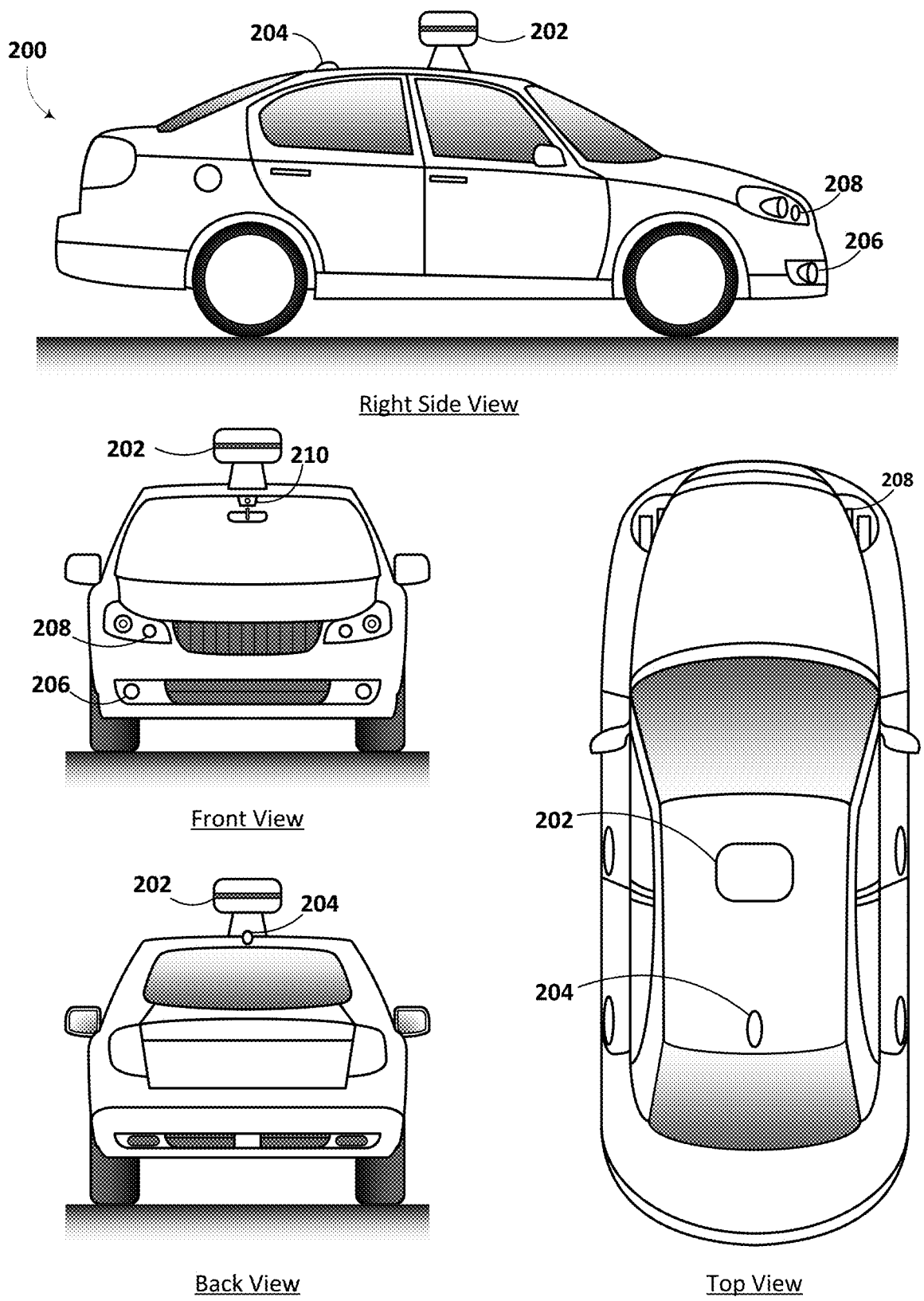
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
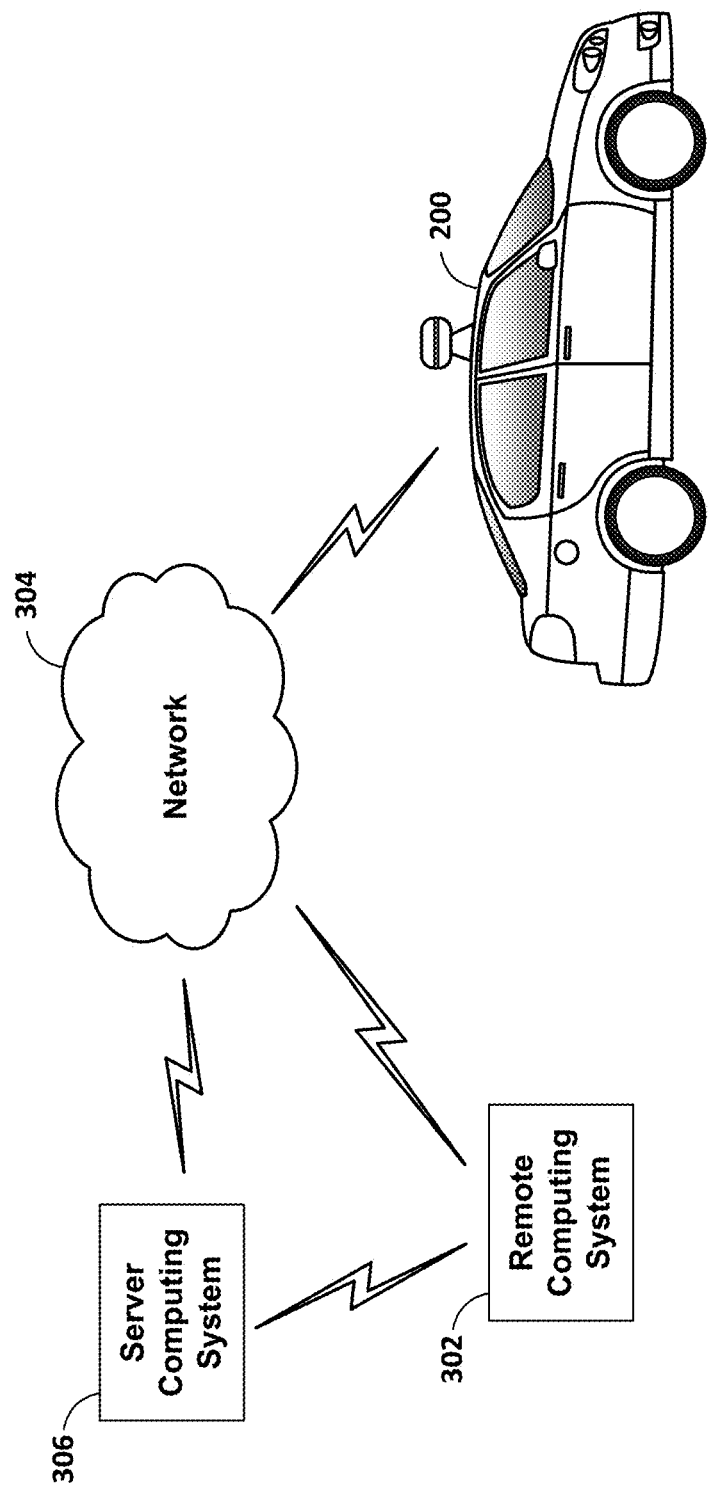
FIG. 3 is a conceptual illustration of wireless communication between various computing systems related to a vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
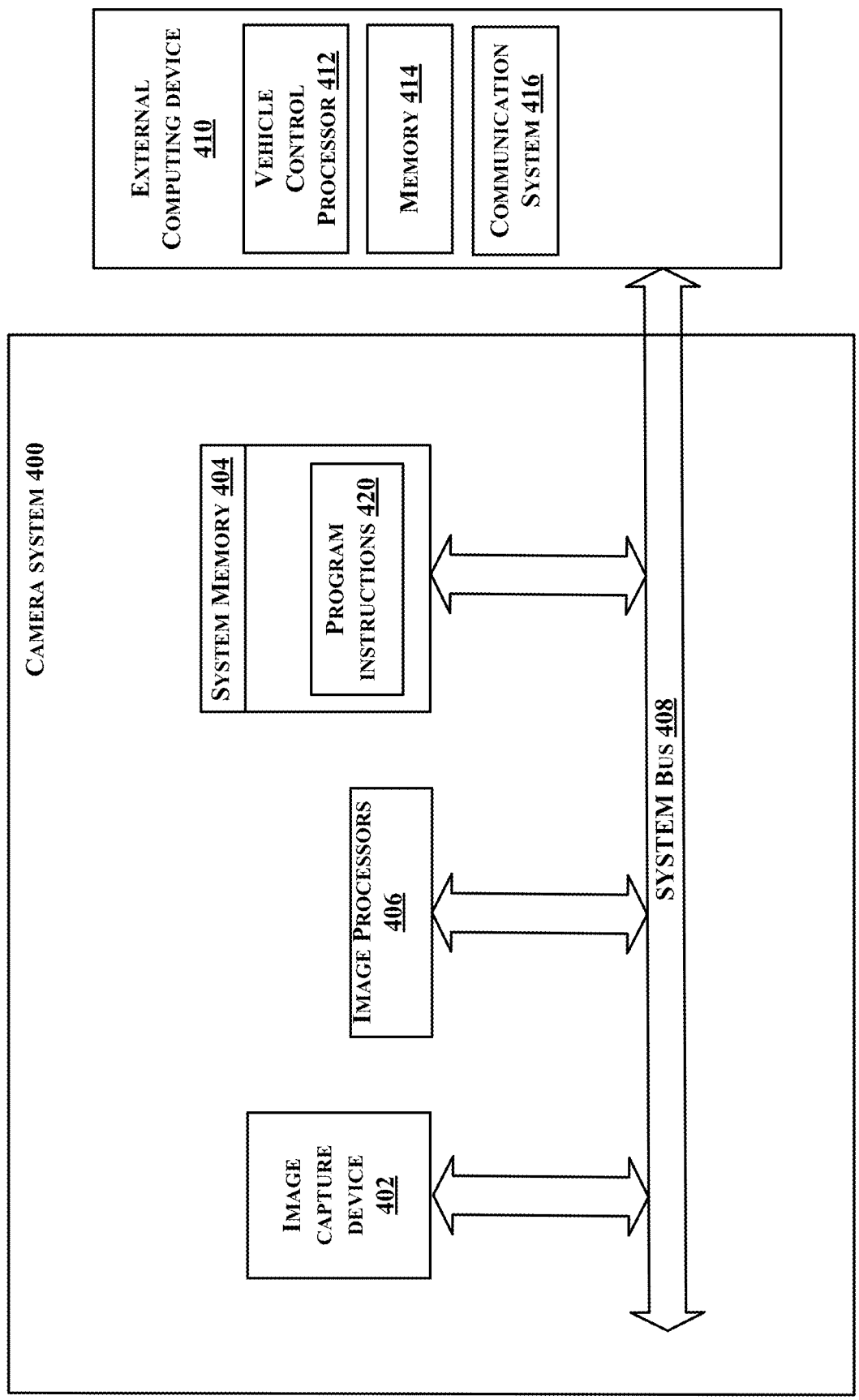
FIG. 4 is a simplified block diagram depicting components of a camera system, according to an example implementation.

FIG. 4 is a simplified block diagram depicting components of an example camera system 400 of a vehicle for capturing images. The camera system 400 may correspond to the camera system 130 of FIG. 1. In some examples, the vehicle may include more than one camera system. For example, the vehicle may include one camera system mounted to a top of the vehicle in a sensor dome and another camera system may be located behind the windshield of the vehicle. In other examples, the various camera systems may be located in various different positions throughout the vehicle.

As shown in FIG. 4, the camera system 400 may include an image capture device 402, a system memory 404, and a processor 406. The camera system 400 may be configured to capture image data and transmit the image data to the components and/or systems of the vehicle. In some implementations, the processor 406 may comprise multiple processors and the system memory 404 may be located within the same physical housing as the processor 406. Although various components of camera system 400 are shown as distributed components, it should be understood that any of such components may be physically integrated and/or distributed according to a desired configuration of the camera system 400.

Further, the camera system 400 may include a system bus 408. Although depicted as a single bus, the system bus 408 may be composed of multiple buses. The system bus 408 may be implemented using any suitable communication technology and may include connection technology that allows multiple components to share the system bus 408. For example, the system bus 408 may be configured to enable the transfer of image frames (e.g., image data) between the image capture device 402, the system memory 404, and/or the processor 406. Further, the system bus 408 may communicatively couple the camera system 400 with an external computing device 410. For example, the system bus 408 may enable the image capture device 402 and/or the processor 406 to send image data to the external computing device 410.

The external computing device 410 may include a vehicle-control processor 412, a memory 414, a communication system 416, and other components. The external computing system 410 may be located in the autonomous vehicle. The communication system 416 of the external computing device 410 may be configured to communicate data between the vehicle and a remote device or computer server. The memory 414 of the external computing device 410 may have a larger capacity than the system memory 404 of the camera system 400. The memory 414 may also be used for longer term storage than the system memory 404. In some examples, image data received by the external computing device 410 may be used by a navigation system (e.g., a navigation processor) of the vehicle. Further, the external computing system 410 may be configured to control various operations of the camera system 400, among other options.

The image capture device 402 of the camera system 400 may be configured to capture image data and transfer the image data to the system memory 404 and/or processor 406. In some examples, the image capture device 402 may include a camera or an image sensor. The image capture device 402 may be implemented using any suitable image sensor technology, including a charge coupled device (CCD) or a complementary metal oxide semiconductor (CMOS) image sensor. The image capture device 402 may include pixel elements arranged in a two-dimensional (2D) grid or array to detect image data. In some implementations, the pixel element may be arranged in a three-dimensional (3D) array. When the pixel elements of the image capture device 402 are sampled, the values associated with each pixel element (e.g., image data) may be captured by the image capture device to generate an image frame (e.g., image). The image frame may be representative of a two-dimensional image of a scene. The image frame may include a plurality of pixels (e.g., image data), and each pixel may correspond to a set of pixel values, such as depth values, photometric values (e.g., red-green-blue (RGB) values, intensity values, chroma values, saturation values, etc.), or a combination thereof.

The image capture device 402 may be configured to capture a burst of a sequence of image frames across a range of exposure times (e.g., a payload burst). The burst of images frames can be used to determine the characteristics of the scene so that parameters for a subsequent burst sequence for capturing additional image frames can be selected. For example, the image capture device 402 may capture a burst of image frames (e.g., images) of a scene using fixed exposure time periods. In other examples, the burst of image frames may be captured by the image capture device 402 using different or variable exposure time periods. The burst of image frames captured by the image capture device 402 may be stored in external memory, such as the system memory 404, for further processing.

The system memory 404 of the camera system 400 may store information including image data that may be retrieved, manipulated, and/or stored by the processor 406. The system memory 404 may be larger than the internal memory included in the processor 406 and may act as the main memory for the camera system 400. In some examples, the system memory 404 may be located outside of or external to an integrated circuit (IC) containing the processor 406. As such, the system memory 404 may be referred to as "off-chip" memory. The system memory 404 may comprise any type of volatile or non-volatile memory technology, such as dynamic random access memory (DRAM), synchronous dynamic random access memory (SDRAM), or Flash memory.

The system memory 404 may also be implemented as electrically erasable programmable read only memory (EEPROM) or another non-volatile or volatile memory type. In some examples, the system memory 404 may be a memory cache or buffer to temporarily store image data. In some implementations, the system memory 404 may be part of the image captured device 402. Further, the system memory 404 may include program instructions 420 that are executable by the processor 406 to facilitate the various functions described herein. For example, image compression and motion estimation algorithms may be stored in the system memory 404 and executed by the processor 406.

The processor 406 of the camera system 400 may be communicatively coupled to the image capture device 402 and the system memory 404. The processor 406 may include any type of processor including, but not limited to, a microprocessor, a microcontroller, a digital signal processor (DSP), an image processor, or any combination thereof. The processor 406 may operate based on instructions, control information from registers, or both. The processor 406 may perform image processing functions on image data captured by the image capture device 402, such as image enhancement (e.g., noise reduction), image stabilization (e.g., to compensate for movement of a camera), and object recognition (e.g., finding a specific object in two or more images), as well as other functions. In addition, the processor 406 may apply any of a number of data reduction techniques to the image data, such as redundancy avoidance, lossless compression, and lossy compression.

The processor 406 may be configured to receive image data from the image capture device 402 and combine the image data using various image processing techniques. For example, the processor 406 may receive a burst of image frames (e.g., a sequence of images) from the image capture device 402 and may store the image frames in an external memory, such as the system memory 404 or memory coupled to or included in the processor 406. Further, the processor 406 may also be configured to fetch or retrieve the image data associated with the image frames from the external memory as well as modify the image frames.

Figure 5:
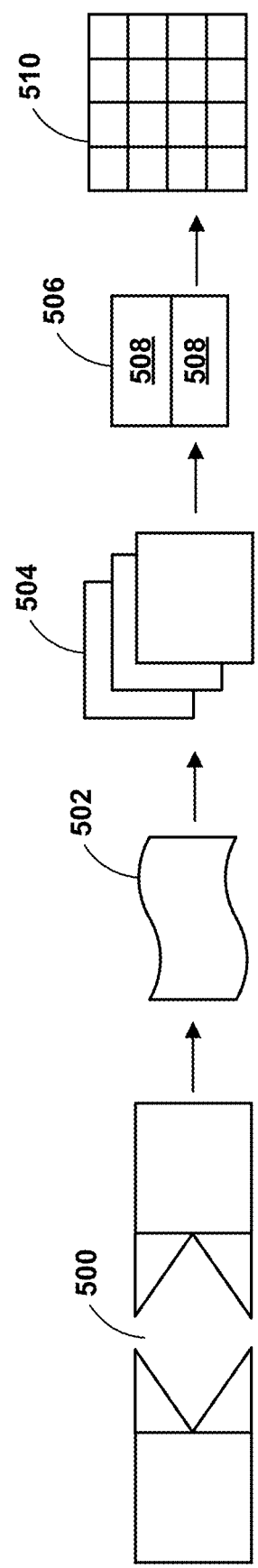
FIG. 5 is a conceptual illustration of a sequence of image frames, according to an example implementation.

The processor 406 may be configured to partition or divide the image data associated with the image frames into a number of regions (e.g., tiles or blocks) and perform image processing operations (e.g., motion estimation) on one or more of the regions. For example, the processor 406 may receive an image stream 500 as shown in FIG. 5. The image stream 500 may include a sequence or series of images or image frames 502. The sequence 502 may include a number of temporally adjacent image frames 504. While three frames are depicted as adjacent image frames 504, the sequence 502 can include any number of adjacent image frames 504.

The processor 406 may subdivide each of the adjacent image frames 504 into individual frames, for example, a single image frame 506. Further, the processor 406 may divide or partition the single image frame 506 into a series of segments or planes 508. The segments (or planes) 508 may be subsets of image frames that permit parallel processing, for example. The segments 508 may also be subsets of image frames that separate the image data into different color components. For example, an image frame 506 of image data can include a luminance plane and two chrominance planes. The segments 508 may be sampled at different resolutions.

Further, the processor 406 may divide or partition the image frame 506 into equal-size tiles or blocks 510. Each tile may include a plurality of pixels (e.g., image data), and each pixel may correspond to a set of pixel values, such as depth values, photometric values (e.g., red-green-blue (RGB) values, intensity values, chroma values, saturation values, etc.), or a combination thereof. The tiles 510 may be arranged to include image data from one or more planes of pixel values or data. The tiles may have a square or rectangular shape and may have a pixel height and pixel width. In some implementations, the tiles may have dimensions of 16×16 pixels or 8×8 pixels. In other implementations, the tiles 510 may be of any other suitable size such as 4×4 pixels, 8×8 pixels, 16×8 pixels, 8×16 pixels, 16×16 pixels or larger. The processor 406 may store the image frames of the sequence in the tiled or block format in the internal memory of the processor 406 or in the system memory, such as the system memory 404, for further processing. In some implementations, groups of tiles from the same or different image frames may be processed in parallel using multiple processors.

The processor 406 may use motion estimation techniques to identify changes or movements in the image data that occur between the image frames of a sequence of image frames (e.g., adjacent or temporal image frames). For example, the image data of the image frames may change from image frame to image frame due to movement of objects in the scene (e.g., a moving pedestrian) and/or movement of the image capture device capturing the scene.

The processor 406 may select the image data of one or more portions or tiles in a first image frame (e.g., a base image frame) and may determine the image data of a second image frame (e.g., an alternative image frame) that corresponds or is similar to (e.g., substantially matches) the image data of the first image frame. The processor 406 may determine alignment vectors for identifying the image data of the one or more selected portions in the first image frame that corresponds to the image data of the second image frame (e.g., a matching patch). Using the alignment vectors, the processor may align the image data of the first image frame with the corresponding or similar image data of the second image frame.

The processor 406 may change the size or resolution of the original image frames (e.g., the base and alternative image frames) captured by the image capture device, such as downsize, upsize, down-sample and/or up-sample, etc. the image frames. For example, the processor 406 may downsize or down-sample the image frames according to predetermined ratios. The image frames may be downsized or down-sampled in resolution or size a fixed number of times or a variable number of times depending on the size and resolution of the original image frames.

In some implementations, the processor 406 may perform hierarchical motion estimation techniques to align one or more the image frames of a sequence or series of image frames. For example, an image pyramid approach may be employed to reduce the size or resolution of the image frames to be processed while maintaining the properties of the image frames. In the image pyramid approach, the processor 406 may reduce the image frames in size by downsizing or down-sampling the image data of the original image frames into one or more versions of each image frame (e.g., downsized image frames). The processor 406 may generate a multi-level image pyramid for each of the image frames. Each multi-level image pyramid may represent the multiple different versions or variations of the down-sampled or downsized image frames. Each different version of the image frames may have a different size or resolution.

The processor 406 may generate alignment vectors for each of the plurality of levels of the image pyramids in the order from an uppermost level to a lowermost level of the image pyramids. The alignment vectors may identify corresponding or similar image data between the image frames at each level of the image pyramids. The alignment vectors computed for each level of the image pyramid may be upsampled or upsized for use in an immediate or direct lower level. For example, the alignment vectors from the highest level of an image pyramid may be up-sampled for use at an immediate lower level. In a lower level, the alignment vectors computed for an immediate higher layer may be used (with up-sampling) as initial alignment vectors to identify locations in an image frame to begin a search for image data corresponding to the image data of an associated version of a different image frame (e.g., a base image frame). In the lowest level, the alignment vectors may be computed between the image frames to be aligned based on upscaled or upsized alignment vectors from an immediate or preceding higher level as further described below. For example, the alignment vectors may be computed between the base and alternative image frames in the lowest level using alignment vectors computed between the base image frame and other alternative image frames. Further, in some implementations, the alignment vectors may be computed based on a ratio of a temporal distance between a first image frame (e.g., a base image frame) and a second image frame (e.g., a first alternative image frame) and the temporal distance between the first image frame and a third image frame (e.g., a second alternative image frame). Using the alignment vectors, the image data of the image frames (e.g., alternative image frames) may be aligned with corresponding or similar (e.g., substantially matching) image data of the first image frame (e.g., the base image frame).

Further, the processor 406 can analyze image data of the image frames (e.g., each version of the base image frame) to determine areas or tiles of the image frame that may include image data representing objects or portions thereof. For example, the processor may obtain feature maps of the image frames that represent specific characteristics such as edge, contrast, brightness, etc. In some implementations, the processor may perform edge detection to obtain edge information of objects in the image frames.

Figure 6:
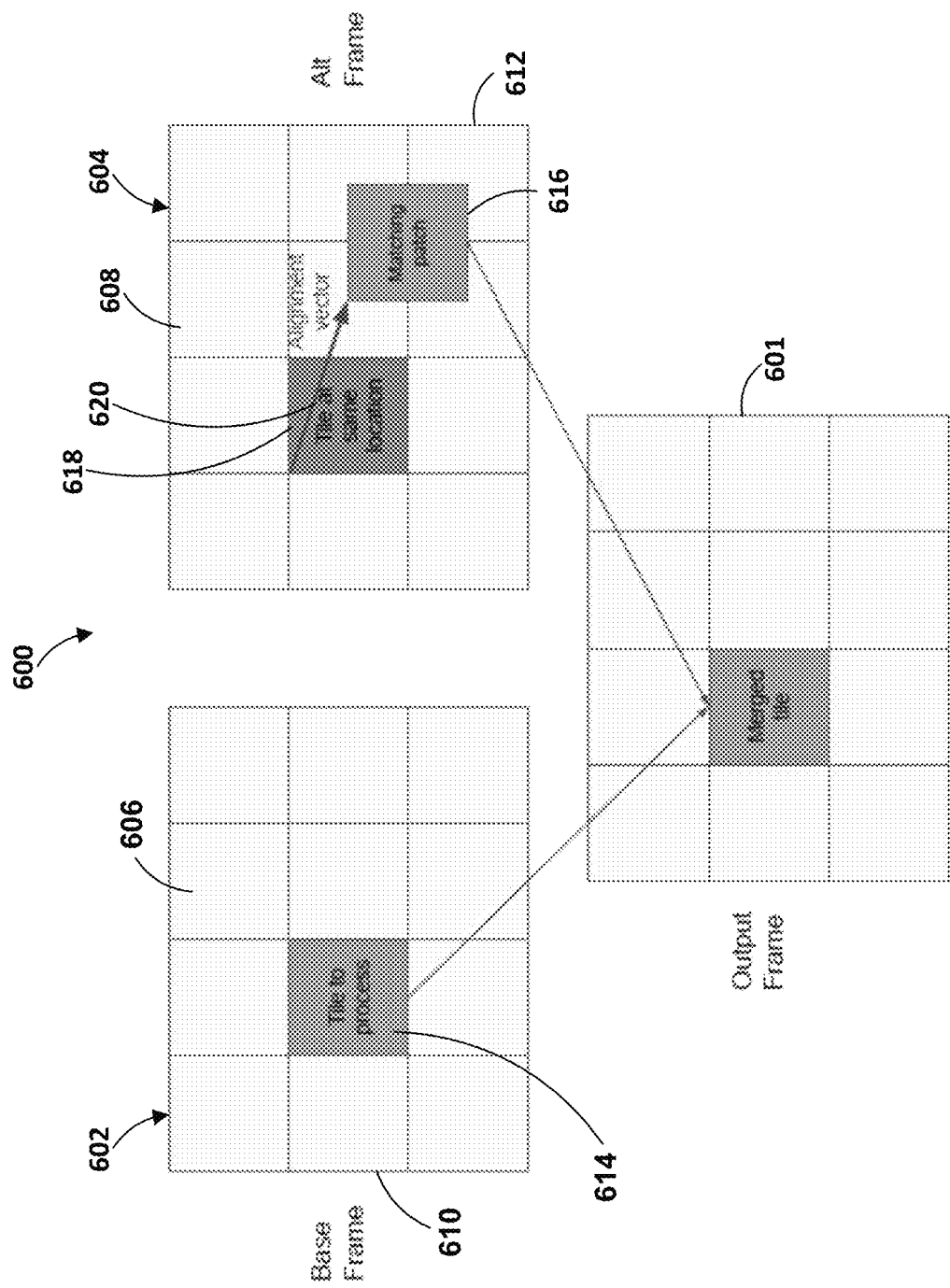
FIG. 6 is a conceptual illustration of merging portions of image frames to form an output image frame, according to an example implementation.

FIG. 6 is a conceptual illustration of merging portions of image frames of a sequence or series of image frames 600 to form an output image frame 601 (e.g., a merged image frame). The sequence of image frames 600 may be captured of a scene during a burst sequence or payload burst. The sequence of image frames 600 may be similar to the image frames described in reference to FIG. 5. As shown in FIG. 6, the sequence of image frames 600 includes a first image frame 602 and a second image frame 604. The first image frame 602 may be captured prior to or later in time than the second image frame 604. For example, the first image frame 602 may be an image frame that is captured immediately before the second image frame 604, in which case the first image frame 602 and the second image frame 604 are consecutive image frames in the sequence of image frames 600. In other examples, the first image frame 602 and the second image frame 604 may not be consecutive frames, but instead may be further spaced apart in time and may have one or more image frames between them.

The first and second image frames 602 and 604 of the sequence of image frames 600 may be received by a processor, such as the processor 406 of FIG. 4, for image processing. The processor may operate based on instructions, control information from registers, or both. The processor may be configured to combine one or more portions of the first image frame 602 with similar or matching portions of the second image frame 604 to form the output or combined image frame 601.

As shown in FIG. 6, the processor may divide the first image frame 602 into a number of square or rectangular tiles 606. Each of the tiles 606 represents a portion of the first image frame 602 and contains a number of pixels (e.g., image data). The processor may also divide the second image frame 604 into a number of square or rectangular tiles 608. Each of the tiles 608 in the second image frame 604 may be co-located with a corresponding tile in the first image frame 602. For example, a co-located tile in the second image frame 604 may have the same coordinates, size, and shape as a corresponding tile in the first image frame 602. For illustrative purposes and ease of understanding, each of the first and second image frames 602 and 604 have been divided into a 4×3 array of non-overlapping tiles having substantially the same shape and size as shown in FIG. 6. In other implementations, the first and second image frames 602 and 604 may include any number of tiles and each tile may include any number of pixels. Further, the tiles in the first and second image frame 602 and 604 may have other shapes. Therefore, the present implementation is not limited in the number, size, and/or shape of the tiles that may be included in the first and second image frames 602 and 604 of the sequence of image frames.

The processor may select one or more image frames from the sequence of image frames 600 as base or key image frames. Further, the processor may select one or more of the remaining image frames as alternative or reference frames to combine with the one or more base image frames. The alternative image frames may occur temporally before or after the base image frame (e.g., an adjacent image frame).

As shown in FIG. 6, the processor may select the first image frame 602 as the base image frame 610 and may select the second image frame 604 as an alternative image frame 612. The processor may be configured to select or identify the base frame based on an aspect of an image, an aspect of the image capture device, and/or an aspect of a vehicle. In some examples, the base image frame may be selected from the image frames based on the capture or sampling times of the image capture device and/or the orientation of the image capture device relative to the vehicle or environment. For example, the computing device may select the image frame that is closest in time to a desired sample time or the last image frame in the sequence of image frames as the base image frame. In other examples, the computing device may select the base image frame from the sequence of image frames by identifying the image frame with the greatest sharpness, most contrast, and/or other image metric; or the image frame that was captured during the least amount of motion (e.g., based on metadata associated with each of the image frames and/or other data about the vehicles existing or planned motions); the image frame that was captured when the vehicle was at a certain location (e.g. a location with known static objects or known lighting conditions or known changes to lighting conditions); or the image frame that was capture when another vehicle sensor was in a certain state, e.g., a certain operating and/or orientation state.

Once the processor selects the base image frame 610 from the sequence of image frames 600, the processor may use motion estimation techniques to identify changes or movements in the image data that occur between the base image frame 610 and the alternative image frame 612 (e.g., an adjacent or temporal image frame) due to local or global motion. For example, the image data associated with the image frames of the sequence of image frames may change from image frame to image frame due to movement of objects in the scene (e.g., a moving pedestrian) and/or movement of the image capture device capturing the scene (e.g., panning, tilt, zoom, rotation, etc. and/or the motion of the image capture device itself). The processor may be configured to determine changes or movements of the image data between the base image frame 610 and the alternative image frame 612 and align the image data of the base image frame 610 with corresponding (e.g., similar or substantially matching) image data of the alternative image frame 612. For example, the processor may align the image data of a portion of the alternative image frame 612 with corresponding image data of a portion of the base image frame 612.

To align the image data of the base image frame 610 with the corresponding image data of the alternative image frame 612, the processor may utilize tile-based (e.g., block-based) motion estimation to compensate for movement of image data (e.g., objects) in the scene or movement of the image capture device. To predict or determine the position or location of corresponding image data of a base image frame in the alternative image frame, the processor may perform a matching process to find and identify tile-sized areas of image data in the alternative image frame 612 that correspond or are similar to (e.g., substantially matches) the image data of the tiles in the base image frame 610. For example, the processor may be configured to perform a pixel-by-pixel comparison of the pixels (e.g., pixel values or image data) of the alternative image frames with respect to the pixels of a tile in the base image frame 610. The processor may perform the pixel-by-pixel comparison to determine a matching criterion or error (e.g., a difference) between the pixels as further described below. The pixel-by-pixel comparison may include a comparison between the values of the pixels (e.g., depth values, photometric values, red-green-blue (RGB) values, or a combination thereof) of the alternative image frame 612 and the values of the pixels of the tiles in the base image frame 610.

As shown in FIG. 6, the processor may select a tile 614 in the base image frame 610 and may search for tile-sized areas in the alternative image frame 612 that may correspond or substantially match the tile 614 in the base image frame, which may or may not be co-located or aligned with the tile 614 in the base image frame 610. For example, the processor may perform a full search of all of the image data of the alternative image frame 612 to identify one or more tile-size areas having corresponding or similar (e.g., substantially matching) image data as the image data of the tile 614 in the base image frame 610. In some implementations, the processor may search a search area or window for tile-sized areas in the alternative image frame 612 that may correspond or substantially match the tile 614 in the base image frame 610. The size of the search area may depend on image resolution (e.g., format), frame rate, and the type of application. In some implementations, the search area may be defined by a pixel height and a pixel width (e.g., a square or rectangular shape) that includes a portion of the pixels or image data of the alternative image frame 612. For example, the search area may be a region in the alternative image frame 612 that is centered about the same coordinates as the tile 614 in the base image frame 610 and is extended by a predetermined displacement or offset. In some implementations, the search for corresponding or similar image data may be performed in a relatively small window (e.g., a search area) around a collocated tile in the alternative image frame.

After identifying one or more tile-size areas in the alternative image frame 612, the processor may be configured to compare the image data (e.g., pixels) of the identified tile-size areas to the image data of the tile 614 in the base image frame 610. The processor may calculate a matching error (e.g., a difference) between the image data (e.g., pixels) of the tile 614 in the base image frame 610 and the image data of each identified tile-sized area in the alternative image frame 612. The matching error may be a numerical representation of similarity of the image data (e.g., pixels) of the tile 614 in the base image frame 610 to the image data (e.g., pixels) of a tile-size area in the alternative image frame 612. For example, the numerical representation may be a number of similar pixels divided by a total number of pixels. Pixels of a tile in the base image frame 610 and a tile-sized area in the alternative frame 612 may be determined to be similar when the pixels exactly match (e.g., have the same numeric value for a particular pixel) or when the pixels substantially match (e.g., the numerical value of a first pixel is within a difference threshold value of a corresponding numerical value of a second pixel). In an alternative embodiment, the matching error may be a numerical representation of dissimilarity between the image data of a tile in the base image frame 610 and the image data of a tile-sized area in an alternative image frame 612. For example, the matching error may be a number of "dissimilar" pixels (e.g., pixels that are not similar as described above) divided by the total number of pixels.

The processor may perform any one of a number of algorithms to calculate or measure the matching error between the image data (e.g., pixels) of the alternative image frame 612 and the image data (e.g., pixels) of the base image frame 610. For example, the processor may compute the sum of absolute differences (SAD), the sum of squared differences (SSD), the sum of absolute transformed differences (SATD), the mean squared differences (MSD), Lucus-Kandae estimations, deep learning methods, loss functions, or other difference calculations between the image data (e.g., pixels) of the tile 614 in the base image frame 610 and the image data (e.g., pixels) of a tile-size area in the alternative image frame 612.

The processor may select the tile-size area having the lowest matching error as a matching patch. In some implementations, the processor may compare the matching error between the image data (e.g., pixels) of the base image frame 610 and the alternative image frame 612 to a threshold value. When the comparison of the matching error to the threshold value indicates that the image data (e.g., pixels) of the tile 612 in the base image frame 610 and the image data of a tile-size area in the alternative image frame 612 are similar or substantially match, the processor may select the tile-size area as a candidate matching patch for merging with the image data of the tile 614 in the base image frame 610. For example, if the matching error is smaller than and/or equal to a threshold value (e.g., indicating that the image data is similar or substantially matches), the processor may identify the tile-size area as a candidate matching patch. The threshold may be based on user input or a predetermined value.

Once the processor determines the candidate matching patches, the processor may select the candidate matching patch that is most similar to the image data (e.g., pixels) of the tile 614 in the base image frame 610 as a matching patch (e.g., the best or closest matching patch). For example, the candidate matching patch that has the smallest matching error (e.g., minimum match error) may be selected as the matching patch. As such, the image data (e.g., pixels) of the matching patch may correspond to or substantially match the image data of the selected tile in a base image frame. In some implementations, the processor may select tiles based on the lowest matching error. As shown in FIG. 6, the processor may identify and select a tile-size area in the alternative image frame 612 as the matching patch 616.

The processor may merge the image data (e.g., pixels) of the selected matching patch 616 with the image data (e.g., pixels) of the tile 614 in the base image frame 610 as further described below. The process for selecting a matching patch for a tile in the base image frame 610 may be performed for all of the tiles in the base image frame 610. In some examples, the matching process may be performed for less than all of the tiles in the base image frame 610. For example, the matching process may be performed for tiles containing image data (e.g., pixels) identifying one or more objects or portions thereof.

Once the matching patches are identified in the alternative image frame 612 for one or more tiles in the base image frame 610, the processor may generate alignment information (e.g., alignment vector field or an alignment map) between the base and alternative image frame. The alignment information may include one or more alignment vectors for the one or more tiles in the base image frame 610 that identify the corresponding matching patch in the alternative image frame. The alignment vectors may be two-dimensional vectors including horizontal component values (e.g., horizontal offsets) and vertical component values (e.g., a vertical offsets). Each alignment vector may identify a different matching patch in the alternative image frame 612.

In some implementations, the alignment vector for a tile in the base image frame 610 may identify a reference tile in the alternative image frame 612 and the location of the matching patch in the alternative image frame 612. The reference tile in the alternative image frame may be co-located (e.g., in the same position) with the tile in the base image frame 610. For example, the reference tile in the alternative image frame 612 may have the same coordinates, size, and shape as the tile in the base image frame 610. Further, the alignment vectors may represent a displacement or offset between the reference tile and the matching patch in the alternative image frame 610. The alignment information may also include a resolution for the alignment vectors, a location of the reference tile in the alternative image frame, a direction that identifies whether the alternative image frame is before or after the base image frame, a horizontal pixel range (e.g., pixel width), a vertical pixel range, (e.g., pixel height) and/or a combination thereof.

As shown in FIG. 6, the processor may generate alignment information between the tile 614 of the base image frame 610 and the matching patch 616 of the alternative image frame 610. For example, the processor may generate alignment information for identifying a reference tile 618 in the alternative image frame 612 that has the same location or position as the tile 614 in the base image frame 610 and for identifying an offset from the tile 618 to the corresponding matching patch 616 in the alternative image frame 612. As shown, the reference tile 618 in the alternative image frame 612 may be co-located with the tile 614 in the base image frame 610. Further, the alignment information may include an alignment vector 620 for identifying the matching patch 616 in the alternative image frame 612. The alignment vector may represent an offset from the reference tile 618 in the alternative image frame 612 to the matching patch 616.

In some implementations, the alignment vector may represent an offset or projection from the tile in the base image frame to the matching patch in the alternative image frame.

As shown in FIG. 6, the alignment vector 620 extends from a pixel in the upper left hand corner of the reference tile 618 with the head of the arrow pointing to a pixel in the upper left hand corner of the matching patch 616. In other implementations, the alignment vector 620 may extend from a pixel in the center of the reference tile in the alternative image frame 612 to a pixel in the center of the matching patch 616. Further, the alignment vector 620 may be defined in other ways. For example, the alignment vector 620 may include a horizontal offset and a vertical offset. In some implementations, the alignment vector 620 may include a row value and a column value (e.g., (Vx, Vy)).

Once the processor determines the alignment vector 620 for identifying image data in the alternative image frame that corresponds to the image data of the selected tile 614 in the base image frame 610, the processor may align the image data of the tile 614 in the base image frame 620 using image processing techniques. For example, the alignment vector 620 may be stored with the image data of the tile 614 in the base image frame 610 or in a list of alignment vectors. The processor may use the alignment vector 620 to fetch the image data (e.g., pixels) of the matching patch 616 for the tile 614 in the base image frame 610 from memory, such as external memory.

Once the image data (e.g., pixels) of the matching patch 616 is retrieved from the memory, the processor may use various image processing techniques to combine or merge the image data of the tile 614 in the base image frame 610 with the image data of the matching patch 616 to form the combined or output image frame 601. For example, the processor may receive the base image frame 610 and may obtain the alignment vectors of one or more tiles in the base image frame 610. The processor may use the alignment vectors of the tiles in the base image frame 610 to fetch the image data of the matching patches in the alternative image frame 612.

Once the processor receives the image data of the matching patches in the alternative image frame 612, the processor may merge or combine the image data (e.g., pixels) of the image frames to form output image frames (e.g., enhanced images). In some implementations, different alternative image frames may be merged with a base image frame in parallel using multiple processors.

As shown in FIG. 6, the processor may be configured to combine the image data (e.g., pixels) of the tile 614 in the base image frame 610 with the image data of the matching patch 616 of the alternative image frame 612 to form the output image frame 601 (e.g., an enhanced image). The image data of the matching patch 616 of the alternative image frame 612 may be merged with the image data of the base image frame 610 using any suitable image fusion technique, such as Exposure Fusion that blends multiple exposures of the same scene into a single image. As such, one or more of the alternative image frames of the sequence of image frames 600 may be merged or synthesized into one or more base image frames to form output image frames (e.g., payload images) or a series of output image frames.

As described above, motion estimation techniques using alignment vectors may be used to determine changes or movements in the image data that occur between the base image frame 610 and the alternative image frames 612 (e.g., adjacent or temporal image frames) due to local or global motion. The alignment vectors may identify the image data of tile-sized areas in the alternative image frames 612 that correspond to or are similar to (e.g., substantially match) the image data of tiles in the base image frame 610.

In some examples, high speed or rapid local or global motion that occurs during the capture of a sequence of image frames may present difficulties in determining alignment vectors that identify image data of the alternative image frames that corresponds to or is similar to the image data of the base image frame. That is, determining the motion within a sequence of image frames may be complicated by changes in the speed of motion, such as over multiple frames in a sequence. For example, an object moving in a sequence of consecutive image frames may move more quickly between image frames of the first half of the sequence and more slowly between image frames of a second half of the sequence. Similarly, different portions of an image frame (e.g., a tile of the image frame) captured by an image capture device (e.g., camera) may shift or change significantly between image frames due to global or local motion. For example, the image capture device may move rapidly when capturing the image frames and/or an object (e.g., a vehicle or a person) may move quickly in the sequence while the image frames are being captured. Thus, different portions or tiles in the image frames can have different trajectories between consecutive image frames.

When significant global or local motion occurs during the capture of the sequence of image frames, a considerable amount of computation time may be required to identify corresponding or similar image data between the image frames (e.g., a base image frame and one or more alternative image frames) and to compute the alignment vectors between the image frames. Further, in some implementations, the search for corresponding or similar image data may be performed in a relatively small window (e.g., a search area) around a co-located tile in the alternative image frame. As a result, when global or local motion is large, suitable corresponding or similar image data may not be found in the searching area in the alternative image frames. Thus, the alignment vectors may not be accurately computed to identify the corresponding image data between the image frames and, thus, the alignment vectors may be unreliable. For example, the alignment vectors may identify image data of tiles-sized areas in the alternative image frames that may not be similar to the image data of the tiles of the base image frame.

When the alignment vectors do not identify corresponding or similar image data, the image data of the one or more alternative image frames may not be properly aligned with the corresponding or similar image data (e.g., matching patches) of the base image frame. As such, the image data of the alternative image frames may be merged with non-matching or non-similar image data of the base image frame. As a result, the merged image frame may not correctly represent the scene (e.g., the environment surrounding the autonomous vehicle). Thus, the efficacy of using alignment vectors to identify corresponding or similar image data with traditional tile-based motion estimation techniques may be limited to tracking consistent and slow motion activities between the base image frame and the alternative image frames.

In order to improve the accuracy of the alignment vectors and to decrease the required amount of computations and computational costs for aligning image frames exhibiting significant motion (e.g., due to the large size of image frames), hierarchical motion estimation approaches may be employed to reduce the size of the image frames to be processed while maintaining the properties of the image frames. For example, an image pyramid motion estimation approach may reduce the image frames in size by downsampling or downsizing the image data of each image frame into one or more different versions or variations (e.g., different image frames in a multi-level image pyramid generated from the image data of the original base and alternative image frames). Each multi-level image pyramid may include multiple images having different sizes or resolutions (e.g., downsized image frames) on each level of the pyramid.

Alignment vectors may be computed between the image frames on each level of the image pyramids and the alignment vectors from higher levels of the image pyramids may be up-sampled for use in lower levels or layers of the image frames. For example, in a lower layer, the alignment vectors computed in an immediate higher layer may be used (with up-sampling) as initial alignment or predicted vectors for identifying locations in image frames to start searching for corresponding or similar image data between image frames. The initial alignment vectors may be determined between the base and alternative image frames based on upsized versions of the alignment vectors computed between lower sized versions of the base and alternative image frames in an immediate higher level of the image pyramids.

Further, additional initial alignment vectors may be determined between the image frames based on alignment vectors from preceding image frames on the same level of the image pyramids and the temporal distances between the image frames. For example, the additional initial alignment vectors may be computed between the base and alternative image frames in the lowest level using alignment vectors computed between the base image frame and preceding alternative image frames. In some implementations, the initial alignment vectors may be computed based on an alignment vector between the base image frame and a first alternative image frame and a ratio of the temporal distance between the base image frame and the first alternative image frame and the temporal distance between the base image frame and the second alternative image. Using these initial alignment vectors, a location in the alternative image frames may be identified to begin a search for image data that corresponds to the image data of the base image frame. Once the corresponding image data is identified between the base and alternative image frames, alignment vectors may be generated for identifying the corresponding image data. The alignment vectors may be used to align the image data between the base image frame and the alternative image frames.

Figure 7:
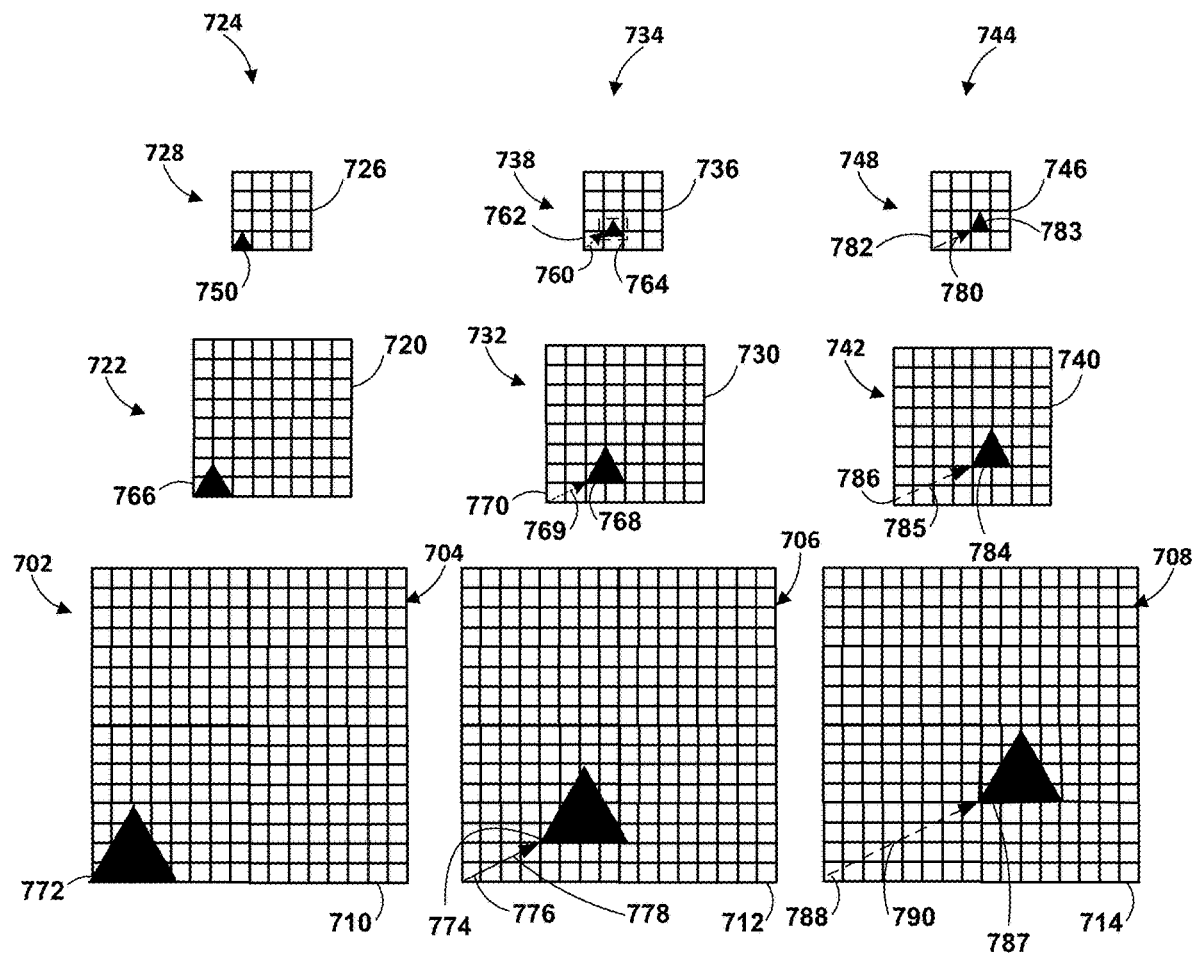
FIG. 7 is a conceptual illustration of image pyramids formed from a sequence of image frames, according to an example implementation.

FIG. 7 illustrates a conceptual representation of image pyramids generated for a sequence or series of image frames captured by an image capture device, such as the image capture device 402 of FIG. 4. The image frames may be part of a burst of a sequence of image frames captured by the image capture device. As shown in FIG. 7, the sequence of the image frames 702 may include a first image frame 704, a second image frame 706, and a third image frame 708. The first image frame 704 may be captured prior in time than the second image frame 706 and the second image frame 706 may be captured prior in time than the third image frame 708. For example, the first image frame 704 may be an image frame that is captured immediately before the second image frame 706, in which case the first image frame 704 and the second image frame 706 are consecutive image frames in the sequence of image frames. Similarly, the second image frame 706 may be an image frame that is captured immediately before the third image frame 708, in which case the second image frame 706 and the third image frame 708 are consecutive image frames in the sequence of image frames. In other examples, the first image frame 704, the second image frame 706, and the third image frame 708 may not be consecutive frames, but instead may be further spaced apart in time and may have one or more image frames between them. Although only three image frames are shown in FIG. 7, one skilled in the art will recognize that the sequence of image frames may include four or more image frames.

One or more of the image frames of the sequence of image frames 702 may be selected as a base or key image frame. The base frame may be selected or identified based on an aspect of an image, an aspect of the image capture device, and/or an aspect of a vehicle. In some examples, the base image frame may be selected from the image frames based on the capture or sampling times of the image capture device and/or the orientation of the image capture device relative to the vehicle or environment. For example, the computing device may select the image frame that is closest in time to a desired sample time or the last image frame in the sequence of image frames as the base image frame. In other examples, the computing device may select the base image frame from the sequence of image frames by identifying the image frame with the greatest sharpness, most contrast, and/or other image metric; or the image frame that was captured during the least amount of motion (e.g., based on metadata associated with each of the image frames and/or other data about the vehicles existing or planned motions); the image frame that was captured when the vehicle was at a certain location (e.g. a location with known static objects or known lighting conditions or known changes to lighting conditions); or the image frame that was capture when another vehicle sensor was in a certain state, e.g., a certain operating and/or orientation state.

The remaining image frames of the sequence of image frames 702 may be designated as alternative or reference image frames to be aligned with the base image frame. The alternative image frames may occur temporally before or after the base image frame (e.g., adjacent image frames). In other implementations, the image frame that is at or near the end of the sequence of image frames may be selected as the base image frame and the preceding image frames may be designated as alternative or reference image frames to be aligned with the base image frame. As shown in FIG. 7, the first image frame 704 may be selected as the base image frame 710. The second image frame 706 may be designated as a first alternative image frame 712 and the third image frame 708 may be designated as a second alternative image frame 714.

The image data of one or more of the alternative image frames 712 and 714 may be aligned and combined with the image data of the base image frame 710 to form a single image frame (e.g., a merged or combined image frame). Since the images frame may have a relatively high resolution, it may take considerable time to compute alignment vectors using traditional motion estimation techniques on the original image frames. As such, resizing techniques may be used to reduce the size or the resolution of the original image frames so that smaller sized or lower resolution image frames may be used to perform motion estimation techniques to determine alignment information or vectors between the image frames. The alignment vectors determined between the smaller sized image frames may be upsized and used to identify locations in larger sized or higher resolution image frames to begin a search for image data that corresponds or is similar to (e.g., substantially matching) the image data in the larger sized image frames as further described below. The locations for starting a search may be shifted and other areas in the image frames may be searched to identify corresponding or similar image data between the larger sized image frames. Once the corresponding image data is identified, alignment vectors may be determined for identifying the corresponding image data between the image frames.

In some implementations, image resizing may include down-sampling or downsizing the image data of each image frame of the sequence into one or more image pyramids. For example, the image frames (e.g., base and alternative image frames) in the sequence of image frames captured by an image capture device may be down-sampled or downsized and arranged in a number of image pyramids containing n levels or layers of image frames having different resolutions or sizes. The number of levels of the image pyramids may depend on the size of the original image frames (e.g., full sized image frames), that is, larger original image frames may result in more levels in an image pyramid. The image frames of the image pyramids that have the same size or resolution as the original image frames (e.g., the largest image frames) may be referred to as zeroth-level image frames and the image frames of the image pyramids that have the smallest size or resolution may be referred to as nth-level image frames. As such, the smaller the size of the image frame, the higher the level of the image frame may be in the image pyramid.

As shown in FIG. 7, the first image frame 704 (e.g., the base image frame 710), the second image frame 706 (e.g., the first alternative image frame 712), and the third image frame 708 (e.g., the second alternative frame 714) may be downsized to form three image pyramids each having three levels or layers (n=2), which represent different resolutions or sizes of the original image frames. Alternatively, the three image pyramids may be considered as one image pyramid that has three images on each level. The image pyramids may be generated by performing sub-sampling that reduces the length and width of each image frame by a particular ratio or rate. Sub-sampling may be performed by dividing an image frame into a number of regions (e.g., 2×2), extracting image data (e.g., one or more pixels) at particular locations in each of the regions, and generating a downsized image frame based on the extracted image data. As such, the size of the image frame belonging to the level directly above the level of the original image frame may be smaller than the size of the original image frame. In some implementations, the down-sampling rate or ratio for each layer may be 2:1, but it should be understood that any down-sampling rate may be used. In general, a higher down-sampling rate (e.g., 4:1, 6:1, 8.1) may save more computation time for estimating motion and determining alignment vectors between the image frames.

In the example shown in FIG. 7, the first image frame 704, the second image frame 706, and the third image frame 708 may be down-sampled to produce versions of the image frames at full resolution, half-resolution, and quarter-resolution. For example, the number of pixels of the image frames 704, 706, and 708 may be reduced by one fourth and/or the size of the image frames may be reduced by one fourth (e.g., the length and width of each image frame at each level may be reduced by 50 percent). The image frames 704, 706, and 708 may be downsized or down-sampled in size or resolution a fixed number of times or may be downsized or down-sampled a variable number of times depending on the original size and resolution of the image frames. Alternatively, the image frames 704, 706, and 708 may be down-sampled fewer or more times than the example shown in FIG. 7. It should be understood that the example illustrated in FIG. 7 is illustrative only, and actual image frames processed by the alignment method described herein may have a larger number of pixels and a higher resolution than illustrated.

As shown in FIG. 7, the image frames 704, 706, and 708 may be down-sampled to a first level having a first predefined size and to a second level having a second predefined size. As shown, the first image frame 704 (e.g., the base image frame 710) may be down-sampled to generate a first downsized image frame 720 in a first level or layer 722 of a first image pyramid 724 and a second downsized image frame 726 in a second level 728 (e.g., the highest level) of the first image pyramid 724. Similarly, the second image frame 706 (e.g., the first alternative image frame 712) may be downsized to generate a first downsized image frame 730 in a first level or layer 732 of a second image pyramid 734 and a second downsized image frame 736 in a second level 738 of the second image pyramid 734. Further, the third image frame 708 (e.g., the second alternative image frame 714) may be downsized to generate a first downsized image frame 740 in a first level or layer 742 of a third image pyramid 744 and a second downsized image 746 in a second level 748 of the third image pyramid 744. As shown, the second downsized image frames 726, 736, and 746 of each image pyramid may be the smallest image frame in the highest level of the image pyramids.

Further, the image frames in each of the levels of the image pyramids 724, 734, and 744 may be divided into a number of non-overlapping tiles having substantially the same shape and size. The non-overlapping tiles may be arranged in a plurality of horizontal rows and a plurality of vertical columns. As shown in FIG. 7, the tiles in the image frames each may have a square or rectangular shape. In other implementations, the tiles in the image frames may have other shapes. The image frames may include any number of tiles and each tile may include any number of pixels (e.g., image data). Therefore, the present implementation is not limited in the number, size, and/or shape of the tiles that may be included in the image frames of the image pyramids.

Each tile in the second downsized image frame 736 of the second image pyramid 734 may be co-located with a tile in the second downsized image frame 726 of the first image pyramid 724. As such, each tile in the second downsized image frame 736 of the first image pyramid 724 may have the same coordinates, size, and shape as the corresponding co-located tile in the second downsized image frame 726 of the second image pyramid 734 (e.g., co-located tiles). Similarly, each tile in the second downsized image frame 746 of the third image pyramid 744 may be co-located with a tile in the second downsized image frame 726 of the first image pyramid 724 and may be co-located with a tile in the second downsized image frame 736 of the second image pyramid 734. As such, each tile of the second downsized image frame 746 of the third image pyramid 744 may have the same coordinates, size, and shape as the corresponding co-located tile in the second downsized image frame 726 of the first image pyramid 724 and the corresponding co-located tile in the second downsized image frame 736 of the second image pyramid 734.

Changes or movements of the image data (e.g., pixels) may occur between the second downsized image frame 726 of the first image pyramid 724 and the second downsized image frames 736 and 746 of the second and third image pyramids 734 and 744. For example, the image data may change between the second downsized image frame 726 of the first image pyramid 724 and the second downsized image frames 736 and 746 of the second and third image pyramids 734 and 744 due to movement or motion of objects in the scene (e.g., a moving pedestrian) and/or movement of the image capture device capturing the scene. To determine the movement of the image data between the image frames, a tile-based (e.g., block-based) matching or comparing process may be used to find and identify tile-sized areas of image data in one or more second downsized image frames of the second and third image pyramids 734 and 744 that correspond or are similar to (e.g., substantially match) image data of one or more tiles in the second downsized image frame 726 of the first image pyramid 724.

As shown in FIG. 7, a tile 750 in the second downsized image frame 726 of the first image pyramid 724 may be selected and tile-sized areas of image data (e.g., pixels) in the second downsized image frame 736 of the second image pyramid 734 may be searched for corresponding or similar (e.g., substantially matching) image data, which may or may not be co-located or aligned with the tile 750 in the second downsized image frame 726 of the first image pyramid 724. The tile 750 in the second downsized image frame 726 of the first image pyramid 724 may be selected based on detecting image data representing an object or a portion thereof in the second downsized image frame 726. For example, the tiles in the second downsized image frame 726 that include image data representing an object or a portion thereof may be selected and tile-size areas in the second downsized image frame 736 of the second image pyramid 734 may be searched for image data that corresponds or is similar to (e.g., substantially matches) the image data of the tile 750 in the second downsized image frame 726 of the first image pyramid 724. In other implementations, each of the tiles in the second downsized image frame 726 of the first image pyramid 724 may be selected for finding corresponding or similar image data in the second downsized image frame 736 of the second image pyramid 734.

In some implementations, a full search may be performed of all of the image data (e.g., pixels) in the second downsized image frame 736 of the second image pyramid 734 to identify one or more tile-size areas having image data corresponding or similar to (e.g., substantially matching) the image data of the tile 750 in the second downsized image frame 726 of the first image pyramid 724. In other implementations, a particular search area may be searched in the second downsized image 736 frame of the second image pyramid 734 to find and identify tile-sized areas having corresponding or similar image data to a tile in the second downsized image frame 726 of the first image pyramid 724 as described above. For example, the search area may be a region in the second downsized image frame 736 of the second image pyramid 734 that is centered about the same coordinates as the tile in the second downsized image frame 726 of the first image pyramid 724 and may be extended by a predetermined displacement or offset. In some implementations, the search for corresponding or similar image data may be performed in a relatively small window (e.g., a search area) around a tile in the alternative image frame.

After identifying one or more tile-size areas in the second downsized image frame 736 of the second image pyramid 734, the image data (e.g., pixels) of the identified tile-size areas may be compared to the image data of the tile 750 in the second downsized image frame 726 of the first image pyramid 724. A matching error (e.g., a difference) may be measured or calculated between the image data of the tile 750 of the second downsized image frame 726 and the image data of each identified tile-sized area in the second downsized image frame 736. The matching error may be calculated using any of the algorithms described above. The tile-size area having the lowest matching error may be selected as a matching patch.

In some implementations, the matching error may be compared to a threshold. For example, when the comparison of the matching error to a threshold value indicates that the image data (e.g., pixels) of the tile 750 in the second downsized image frame 726 and the image data of a tile-size area in the second downsized image frame 736 are similar or substantially match, the tile-size area may be selected as a candidate matching patch. For example, if the matching error is smaller than or equal to a threshold value (e.g., indicating that the image data or pixels are similar or substantially match), the tile-size area may be identified as a candidate matching patch or area.

Once the candidate matching patches are identified, the candidate matching patch that is most similar to the image data (e.g., pixels) of the tile 750 in the second downloaded image frame 726 of the first image pyramid 724 may be identified as a matching patch (e.g., a best or closest matching patch). For example, the candidate matching patch that has the smallest matching error (e.g., minimum match error) may be selected as the matching patch. As shown in FIG. 7, a tile-size area 764 may be identified in the second downsized image frame 736 of the second image pyramid 734 as the matching patch.

Once the matching patches are identified in the second downsized image frame 736 of the second image pyramid 734 for each of the one or more tiles in the second downsized image frame 726 of the first image pyramid 724, alignment information (e.g., an alignment vector field or an alignment map) may be generated between the second downsized image frame 726 and the second downsized image frame 736. The alignment information may include alignment vectors (e.g., displacement vectors) for the one or more tiles in the second downsized image frame 726 to identify the corresponding matching patches in the second downsized image frame 736 of the second image pyramid 734. The alignment vectors may be two-dimensional vectors including horizontal component values (e.g., horizontal offsets) and vertical component values (e.g., vertical offsets). Each alignment vector may identify a different matching patch in the second downsized image frame 736 of the second pyramid 738.

In some implementations, the alignment information for a tile in the second downsized image frame 726 of the first image pyramid 724 may identify a location of a reference tile in the second downsized image frame 736 and may identify a location of the matching patch in the second downsized image frame 736 of the second image pyramid 734. The reference tile identified in the second downsized image frame 736 of the second image pyramid 734 may be co-located (e.g., in the same position) with the tile in the second downsized image frame 726 of the first image pyramid 724. For example, the reference tile of the second downsized image frame 736 of the second image pyramid 734 may have the same coordinates, size, and shape as the tile in the second downsized frame 726 of the first image pyramid 724. Further, the alignment information may include an alignment vector that represents displacements or offsets between the matching patch and the reference tile identified in the second downsized image frame 736 of the second image pyramid 734. The alignment information may also include the resolution for the alignment vector, a direction that identifies whether the second down-sized image frame 726 of the first image pyramid 724 is before or after the second down-sized image frame 736 of the second image pyramid 734, a horizontal pixel range (e.g., pixel width), a vertical pixel range, (e.g., pixel height) and/or a combination thereof.

As shown in FIG. 7, the alignment information for the tile 750 in the second downsized image frame 726 may identify a co-located tile 762 in the second downsized image frame 736 of the second image pyramid 734 that has the same location or position as the tile 750 in the second downsized image frame 726 of the first image pyramid 724. The alignment information may also include an alignment vector 760 for identifying a matching patch 764 in the second downsized image frame 736 of the second image pyramid 734 that is offset from the co-located tile 762 in the second downsized image frame 736. As shown in FIG. 7, the alignment vector 760 extends from a pixel in the lower left hand corner of the co-located tile 762 with the head of the arrow pointing to a pixel in the lower left hand corner of the matching patch 764. In other implementations, the alignment vector 760 may extend from a pixel in the center of the co-located tile 762 in the second downsized image frame 736 to a pixel in the center of the matching patch 764. The alignment vector 760 may be defined in any suitable way to identify the matching patch 764 in an image frame. For example, the alignment vector may include a horizontal component value (e.g., a row value) and a vertical component value (e.g., a column value) (Vx, Vy).

The alignment vectors determined between the image frames of the second levels (e.g., the highest level) of the image pyramids may be upsampled for use in an immediate lower level. For example, the alignment vectors determined between the second downsized image frames 726 and 736 at the second level of the first and second image pyramids 724 and 734 may be upscaled or upsized for use to determine alignment vectors between the image frames (e.g., the first downsized image frames) in an immediate lower level (e.g., the first level) of the image pyramids. The alignment vectors may be upsized by a ratio or factor based on the difference in sizes of the image frames in the first and second levels of the image pyramids. The upscaled or upsized alignment vectors may be used as initial alignment vectors (e.g., predicted vectors) for identifying positions or locations of tile-sized areas in the first downsized image frame 730 to begin a search for image data that corresponds to the image data of a tile in the first downsized image frame 720 of the first image pyramid 724.

The position of each of the tile-sized areas identified by the upsized alignment vectors in the first downsized image frame 730 may be shifted or moved horizontally and vertically in the first downsized image frame 730 by an offset (e.g., one or more pixels) to identify additional tile-sized areas for searching. The position of the tile-sized areas may be moved or shifted any suitable number of times by an offset. After determining the tile-size areas in the first downsized image frame 730, the image data of the identified tile-size areas may be compared to the image data of the tile in the first downsized image frame 720 of the first image pyramid 724 to find the tile-sized area of the first downsized image frame 730 that most closely matches the tile in the first downsized image frame 720. The tile in the first downsized image frame 720 may be a higher resolution or larger sized tile of an associated tile in the second downsized image frame 726 of the first image pyramid 724.

A matching error (e.g., a difference) may be measured or calculated between the image data of the tile in the first downsized image frame 720 of the first image pyramid 724 and the image data of each of the tile-sized areas in the first downsized image frame 730 of the second image pyramid 734. The matching error may be calculated using any of the algorithms described above. The tile-size area having the lowest matching error may be identified as a matching patch.

In some implementations, the matching error may be compared to a threshold. For example, when the comparison of the matching error to a threshold value indicates that the image data (e.g., pixels) of the tile in the first downsized image frame 720 and the image data of a tile-size area in the first downsized image frame 730 are similar or substantially match, the tile-size area may be identified as a candidate matching patch. For example, if the matching error is smaller than or equal to a threshold value (e.g., indicating that the image data is similar or substantially matches), the tile-size area, which may or may not correspond to the tile in the first downsized image frame 720, may be identified as a candidate matching patch.

Once the candidate matching patches are identified in the first downsized image frame 730, the candidate matching patch that is most similar to the image data of the selected tile in the first downsized image frame 720 of the first image pyramid 724 may be identified or selected as a matching patch (e.g., a best or closest matching patch). For example, the candidate matching patch that has the smallest matching error (e.g., minimum match error) may be selected as the matching patch. As shown in FIG. 7, a tile-size area 768 in the first downsized image frame 730 of the second image pyramid may be identified and/or selected as the matching patch.

Once the matching patches are identified in the first downsized image frame 730 of the second image pyramid 734 for each of the one or more tiles in the first downsized image frame 720 of first image pyramid 724, alignment information (e.g., an alignment vector field or an alignment map) may be generated between the first downsized image frame 720 and the first downsized image frame 730. The alignment information may include alignment vectors (e.g., displacement vectors) that identify the matching patches in the first downsized image frame 730 of the second image pyramid 734 for the one or more tiles in the first downsized image frame 720. The alignment vectors may be two-dimensional vectors including horizontal component values (e.g., horizontal offsets) and vertical component values (e.g., vertical offsets). Each alignment vector may identify a different matching patch in the first downsized image frame 730.

In some implementations, the alignment information for a tile in the first downsized image frame 720 of the first image pyramid 724 may include an alignment vector for identifying a location of a reference tile in the first downsized image frame 730 of the second image pyramid 734 and for identifying the location of the matching patch in the first downsized image frame 730. The reference tile identified in the first downsized image frame 730 may be co-located (e.g., in the same position) with the tile in the first downsized image frame 720 of the first image pyramid 724. For example, the reference tile in the first downsized image frame 730 may have the same coordinates, size, and shape as the tile of the first downsized image frame 720 of the first image pyramid 724. Further, the alignment vector may represent a displacement or offset between the matching patch and the reference tile identified in the first downsized image frame 730 of the second image pyramid 734. The alignment information may also include a resolution for the alignment vector, a direction that identifies whether the first downsized image frame 730 of the second image pyramid 734 is before or after the first downsized image frame 720 of the first image pyramid 724, a horizontal pixel range (e.g., pixel width), a vertical pixel range, (e.g., pixel height) and/or a combination thereof.

As shown in FIG. 7, the alignment information for the tile 766 in the first downsized image frame 720 may identify a tile 770 (e.g., a reference tile) in the first downsized image frame 730 of the second image pyramid 734. The tile 770 may have the same location or position as the tile 766 in the first downsized image frame 720 (e.g., co-located tile). The alignment information may also include the alignment vector 769 for identifying the matching patch 768 in the first downsized image frame 730 of the second image pyramid 734 that is offset from the tile 770 in the first downsized image frame 730. As shown, the alignment vector 769 extends from a pixel in the lower left hand corner of the tile 770 with the head of the arrow pointing to a pixel in the lower left hand corner of the matching patch 768. In other implementations, the alignment vector 769 may extend from a pixel in the center of the co-located tile 770 in the first downsized image frame 730 to a pixel in the center of the matching patch 768. The alignment vector 769 may be defined in any suitable way to identify the matching patch in an image frame. For example, the alignment vector 769 may include a horizontal component value (e.g., a row value) and a vertical component value (e.g. column value) (Vx, Vy)).

The alignment vectors determined between the first downsized image frames of the first levels of the image pyramids may be upscaled or upsized for use in an immediate lower level of the image pyramids. For example, the alignment vectors between the first downsized image frames 720 and 730 may be upscaled or upsized to determine alignment vectors between the image frames in the zeroth level (e.g., the lowest level) of the first and second image pyramids 724 and 734. The alignment vectors may be upsized by a ratio or factor based on the difference in the sizes or resolutions of the image frames in the first and second levels of the image pyramids 724 and 734. The upsized alignment vectors may be used as initial alignment vectors (e.g., predicted vectors) for identifying a position or location of tile-sized areas in the second image frame 706 (e.g., the first alternative image frame 712) to begin a search for image data that corresponds to the image data of a tile in the first image frame 704 of the first image pyramid 724.

The position of each of the tile-sized areas identified by the initial alignment vectors in the second image frame 706 may be shifted or moved horizontally and vertically by an offset (e.g., one or more pixels) to identify additional tile-sized areas for searching. The position of the tile-sized areas may be moved or shifted any suitable number of times by an offset. After determining the tile-size areas in the second image frame 706, the image data of the tile-size areas may be compared to the image data of the tile in the first image frame 704 of the first image pyramid 724 to find the tile-sized areas that most closely match the tile in the first image frame 704. The comparison may be used to find positions of the tile-sized areas in the second image frame 706 that most closely matches the tile in the first image frame 704 of the first image pyramid 724. The tile in the first image frame 704 may have a higher resolution or may be larger sized tile of an associated tile in the first downsized image frame 720 of the first image pyramid 724.

A matching error (e.g., a difference) may be measured or calculated between the image data of the tile in the first image frame 704 and the image data of each of the identified tile-sized areas in the second image frame 706. The matching error may be calculated using any of the algorithms described above. The tile-size area having the lowest matching error may be selected as a matching patch.

In some implementations, the matching error may be compared to a threshold. For example, when the comparison of the matching error to a threshold value indicates that the image data (e.g., pixels) of the tile in the first image frame 704 and the image data of a tile-size area of the second image frame 706 are similar or substantially matches, the tile-size area may be identified as a candidate matching patch. For example, if the matching error is smaller than or equal to a threshold value (e.g., indicating that the image data is similar or substantially matches), the tile-size area may be identified as a candidate matching patch.

Once the candidate matching patches in the second image frame 706 are identified, the candidate matching patch that is most similar to the image data of the tile in the first image frame 704 may be selected as a matching patch (e.g., a best or closest matching patch). For example, the candidate matching patch that has the smallest matching error (e.g., minimum match error) may be selected as the matching patch. As shown in FIG. 7, a tile-size area 774 in the second image frame 706 may be identified as the matching patch.

Once the matching patches are identified in the second image frame 706 for each of the one or more tiles in the first image frame 704, alignment information (e.g., an alignment vector field or an alignment map) may be generated between the first and second image frames 704 and 706. The alignment information may include alignment vectors (e.g., displacement vectors) for one or more tiles in the first image frame 704 that identify the matching patches in the second image frame 706. The alignment vectors may be two-dimensional vectors including horizontal component values (e.g., horizontal offsets) and vertical component values (e.g., vertical offsets).

Each alignment vector may identify a different matching patch in the second image frame 706. In some implementations, the alignment information for a tile in the first image frame 704 may include an alignment vector for identifying a location of a reference tile in the second image frame 706 and for identifying the location of the matching patch in the second image frame 706. The reference tile identified in the second image frame 706 may be co-located (e.g., in the same position) with the tile in the first image frame 704. For example, the reference tile of the second image frame 706 may have the same coordinates, size, and shape as the tile in the first image frame 704. Further, the alignment vector may represent a displacement or offset between the matching patch and the reference tile identified in the second image frame 706. The alignment information may also include a resolution for the alignment vector, a direction that identifies whether the second image frame 706 is before or after the first image frame 704, a horizontal pixel range (e.g., pixel width), a vertical pixel range, (e.g., pixel height) and/or a combination thereof.

As shown in FIG. 7, the alignment information for the tile 772 of the first image frame 704 may identify the tile 776 in the second image frame 706 that has the same location or position as the tile 772 in the first image frame 704 (e.g. co-located tile). The alignment information may also include an alignment vector 778 for identifying the offset of the matching patch 774 from the tile 776 in the second image frame 706. As shown, the alignment vector 778 extends from a pixel in the lower left hand corner of the tile 776 with the head of the arrow pointing to a pixel in the lower left hand corner of the matching patch 774. In other implementations, the alignment vector 778 may extend from a pixel in the center of the tile 776 of the second image frame 706 to a pixel in the center of the matching patch 774. The alignment vector 778 may be defined in any suitable way to identify the matching patch in an image frame. For example, the alignment vector 778 may include a horizontal component value (e.g., a row value) and a vertical component value (e.g. column value) (Vx, Vy)).

The image data of the matching patches in the second image frame 706 may be merged with the corresponding image data of the tiles in the first image frame 704 to form an output image frame or merged image frame. The output image frame may have improved characteristics over the individual image frames of the sequence of image frames. For example, the output image frame may have a greater resolution, a higher dynamic range, a larger depth of field, less noise, a higher sharpness level, and/or less blurring than any of the image frames in the image frame sequence.

Alternatively or additionally, the image data of the third image frame 708 (e.g., the second alternative image frame 714) of the third image pyramid 744 may be combined or merged with the image data of the first image frame 704 (e.g., the base image frame 710) of the first image pyramid 724. Changes or movement of image data may occur between the first image frame 704 and the third image frame 740 due to movement of the objects in the scene or movement of the image capture device. In order to save computation resources and/or time for determining movement between the first image frame 704 and the third image frame 708, alignment vectors may be determined between the downsized images of the first and third image pyramids 724 and 744. For example, alignment vectors may be determined for identifying image data of tile-sized areas in the second downsized image frame 746 of the third image pyramid 744 that correspond or are similar to (e.g., substantially match) the image data of one or more tiles in the second downsized image frame 726 of the first image pyramid 724. The alignment vectors may be determined for all of the tiles in the second downsized image frame 726 or a number of selected tiles (e.g., tiles containing image data representing an object).

A search may be performed to find image data of tile-sized areas in the second downsized image frame 746 of the third image pyramid 744 that may correspond to or match the image data of a tile in the second downsized image frame 726 of the first image pyramid 724. To identify tile-sized areas in the second downsized image frame 746, the alignment vectors between the second downsized image frames 726 and 736 of the first and second image pyramids 724 and 744 may be used to determine initial alignment vectors (e.g., predicted vectors) for identifying tile-sized areas in the second downsized image frames 746 of the third image pyramid 744.

The initial alignment vectors for identifying the tile-sized areas in the second downsized image frame 746 of the third image pyramid 744 may be determined based on the alignment vectors between the second downsized image frames 726 and 736. Further, the initial alignment vectors may be determined based on the temporal distances between image frames. For example, the initial alignment vectors may be computed based on a ratio of a temporal distance between a base image frame (e.g., a first image frame 704) and a first alternative image frame (e.g., a second image frame 706) and a temporal distance between the base image frame (e.g., first image frame 704) and a second alternative image frame (e.g., a third image frame 708). The initial alignment vectors may be computed according to the equations as further described below.

Each initial alignment vector may identify a position of a tile-size area in the second downsized image frame 746 of the third image pyramid 744. The position of each of the tile-sized areas identifying by the initial alignment vectors in the second downsized image frame 746 may be shifted or moved horizontally and vertically in the second downsized image frame 746 by an offset (e.g., one or more pixels) to identify additional tile-sized areas. The position of the tile-sized areas may be moved or shifted any suitable number of times by an offset.

After determining the tile-size areas in the second downsized image frame 746, the image data of the identified tile-size areas may be compared to the image data of the tile in the second downsized image frame 726 of the first image pyramid 724 to find the tile-sized areas in the second down-sized image frame 746 that most closely match the tile in the second downsized image frame 726 of the first image pyramid 724.

A matching error (e.g., a difference) may be measured or calculated between the image data of the tile in the second downsized image frame 726 and the image data of each of the tile-sized areas in the second downsized image frame 746 of the third image pyramid 744. The matching error may be calculated using any of the algorithms described above. The tile-size area having the lowest matching error may be selected as a matching patch.

In some implementations, the matching error may be compared to a threshold. For example, when the comparison of the matching error to a threshold value indicates that the image data (e.g., pixel) of the tile in the second downsized image frame 726 and the image data of a tile-size area in the second downsized image frame 746 are similar or substantially match, the tile-size area may be identified as a candidate matching patch. For example, if the matching error is smaller than or equal to a threshold value (e.g., indicating that the pixels or image data are substantially similar), the tile-size area may be identified as a candidate matching patch.

Once the candidate matching patches are identified, the candidate matching patch that is most similar to the image data of the tile in the first downsized image frame 726 may be identified as the matching patch (e.g., a best or closest matching patch"). For example, the candidate matching patch that has the smallest matching error (e.g., minimum match error) may be selected as the matching patch. As shown in FIG. 7, a tile-size area 783 in the second downsized image frame 746 of the third image pyramid 744 may be identified and selected as the matching patch for the tile 750 in the second downsized image frame 726 of the first image pyramid 724.

Once the matching patches are identified in the second downsized image frame 746 of the third image pyramid 744 for each of the one or more tiles in the second downsized image frame 726 of the first image pyramid 724, alignment information (e.g., an alignment vector field or an alignment map) may be generated between the second downsized image frame 726 and the second downsized image frame 746. The alignment information may include alignment vectors that identify the matching patches in the second downsized image frame 746 of the third image pyramid 744. The alignment vectors may be two-dimensional vectors including horizontal component values (e.g., horizontal offsets) and vertical component values (e.g., vertical offsets). Each alignment vector may identify a different matching patch in the second downsized image frame 746.

In some implementations, the alignment information for a tile in the second downsized image frame 726 of the first image pyramid 724 may identify a location of a reference tile in the second downsized image frame 746 of the third image pyramid 744 and may identify the location of the matching patch in the second downsized image frame 746. The reference tile identified in the second downsized image frame 746 of the third image pyramid 744 may be co-located (e.g., in the same position) with the tile in the second downsized image frame 726 of the first image pyramid 724. The reference tile of the second downsized image frame 746 may have the same coordinates, size, and shape as the tile of the second downsized image frame 726. The alignment information may include an alignment vector that represents a displacement or offset between the matching patch in the second downsized image frame 746 and the reference tile in the second downsized image frame 746. The alignment information may also include a resolution for the alignment vector, a direction that identifies whether the second downsized image frame 746 of the third image pyramid 744 is before or after the second downsized image frame 726 of the first image pyramid 724, a horizontal pixel range (e.g., pixel width), a vertical pixel range, (e.g., pixel height) and/or a combination thereof.

As shown in FIG. 7, the alignment information for the tile 750 in the second downsized image frame 726 may identify a co-located tile 782 in the second downsized image frame 746 of the third image pyramid 744 that has the same location or position as the tile 750 in the second downsized image frame 726 of the first image pyramid 724 (e.g., co-located tile). The alignment information may also include an alignment vector 780 for identifying a matching patch 783 in the second downsized image frame 746 that is offset from the tile 782 identified in the second downsized image frame 746. As shown, the alignment vector 780 extends from a pixel in the lower left hand corner of the tile 782 with the head of the arrow pointing to a pixel in the lower left hand corner of the matching patch 783. In other implementations, the alignment vector 780 may extend from a pixel in the center of the co-located tile of the second downsized image frame 746 to a pixel in the center of the matching patch 783. The alignment vector may be defined in any suitable way to identify the matching patch 783 in an image frame. For example, the alignment vector 780 may include a horizontal component value (e.g., a row value) and a vertical component value (e.g. column value) (Vx, Vy)).

The alignment vectors determined between the image frames at the second level of the image pyramids may be upscaled or upsized for use to determine alignment vectors between the image frames in an immediate lower level of the image pyramids. For example, the alignment vectors between the second downsized image frames 726 and 746 of the second level (e.g., the highest level) in the first and third image pyramids 724 and 744 may be upscaled or upsized and used to determine alignment vectors between the first downsized image frames 720 and 740 in the first level of the image pyramid 724 and 744. As such, the alignment vectors that identify corresponding image data (e.g., a matching patch) in the second downsized image frames 746 in the second level may be up-sampled for use in the first level of the image pyramid 744. The alignment vectors may be upsized by a ratio or factor based on the difference in the sizes or resolutions of the image frames in the first and second levels of the image pyramids. The upscaled or upsized alignment vectors may be used as initial alignment vectors (e.g., predicted vectors) for identifying positions or locations of first tile-sized areas in the first downsized image frame 740 to begin a search for image data that corresponds to the image data of one or more tiles in the first downsized image frame 720 of the first image pyramid 724. The positions of each of the first tile-sized areas may be shifted or moved horizontally and vertically in the first downsized image frame 740 by an offset (e.g., one or more pixels) to identify additional tile-sized areas. The positions of the first tile-sized areas may be moved or shifted any suitable number of times by an offset. The image data of the first tile-sized areas in the first downsized image frame 740 may be compared to a tile in the first downsized image frame as further described below.

Further, the alignment vectors computed between the first downsized image frames 720 and 730 of the first and second image pyramids 724 and 734 may be used to determine additional or second initial alignment vectors (e.g., predicted vectors) for identifying second tile-size areas in the first downsized image frame 740 of the third image pyramid 744. For example, the alignment vectors between the first downsized image frames 720 and 730 may be used to compute the second initial alignment vectors between the first downsized image frames 720 and 740 of the first and third image pyramids 724 and 744. As such, the second initial alignment vectors may be determined based on the alignment vectors between the first downsized image frames 720 and 730. Further, the second initial alignment vectors may be computed based on a ratio of a temporal distance between the first image frame 704 (e.g., the base image frame 710) and the second image frame 706 (e.g., the first alternative image frame 712) and a temporal distance between the first image frame 704 and the third image frame 708 (e.g., the second alternative image frame 714). The second initial alignment vectors may be computed according to the equations as further described below.

Each second initial alignment vector may identify a position of a second tile-size area in the first downsized image frame 740 of the third image pyramid 744 to begin a search for image data that corresponds to the image data of a tile in the first downsized image frame 720. The position of the second tile-sized area may be shifted or moved horizontally and vertically in the first downsized image frame 740 by an offset (e.g., one or more pixels) to identify additional or second tile-sized areas. The position of the second tile-sized area may be moved or shifted any suitable number of times by an offset. The image data of the second tile-sized areas in the first downsized image frame 740 may be compared to the image data of the tile in the first downsized image frame 720.

After identifying the first and second tile-size areas in the first downsized image frame 740 of the third image pyramid 744, the image data associated with the tile-size areas may be compared to the image data associated with the tile in the first downsized image frame 720 of the first image pyramid 724. The comparison may be used to find positions of the tile-sized areas in the first downsized image frame 740 that most closely matches the tile in the first downsized image frame 720 of the first image pyramid 724.

A matching error (e.g., a difference) may be measured or calculated between the image data of the tile in the first downsized image frame 720 and the image data of each of the tile-sized areas in the first downsized image frame 740. The matching error may be calculated using any of the algorithms described above. The tile-size area having the lowest matching error may be selected as a matching patch.

In some implementations, the matching error may be compared to a threshold. For example, when the comparison of the matching error to a threshold value indicates that the image data (e.g., pixels) of the tile in the first downsized image frame 720 and the image data of a tile-size area of the first downsized image frame 740 are similar or substantially match, the tile-size area may be identified as a candidate matching patch. For example, if the matching error is smaller than or equal to a threshold value (e.g., indicating that the pixels or image data is similar or substantially match), the tile-size area may be identified as a candidate matching patch.

Once the candidate matching patches are identified for the tile of the first downsized image frames 720, the candidate matching patches that are most similar to the image data of the tile in the first downsized image frame 720 may be identified and/or selected as matching patches (e.g., a best tile or closest matching patch). For example, the candidate matching patch that has the smallest matching error (e.g., minimum match error) may be selected as the matching patch for the tile in the first downsized image frame 720. As shown in FIG. 7, a tile-size area 784 in the first downsized image frame 740 may be identified and/or selected as a matching patch for the tile 766 in the first downsized image frame 720.

Once the matching patches are identified in the first downsized image frame 740 for each of the one or more tiles in the first downsized image frame 720 of the first image pyramid 724, alignment information (e.g., an alignment vector field or an alignment map) may be generated between the first downsized image frame 720 and the first downsized image frame 740. The alignment information may include alignment vectors that identify the matching patches in the first downsized image frame 740 for the tiles in the first downsized image frame 720. The alignment vectors may be two-dimensional vectors including horizontal component values (e.g., horizontal offsets) and vertical component values (e.g., vertical offsets). Each alignment vector may identify a different matching patch in the first downsized image frame 740.

In some implementations, the alignment information for a tile in the first downsized image frame 720 of the first image pyramid 724 may identify a location of a reference tile in the first downsized image frame 740 of the third image pyramid 744 and may identify the location of the matching patch in the first downsized image frame 740. The reference tile identified in the first downsized image frame 740 may be co-located (e.g., in the same position) with the tile in the first downsized image frame 720. For example, the reference tile of the first downsized image frame 740 may have the same coordinates, size, and shape as the tile in the first downsized image frame 720. Further, the alignment information may include alignment vectors that represent displacements or offsets between the matching patches and the reference tile identified in the first downsized image frame 740. The alignment information may also include resolutions for the alignment vectors, a direction that identifies whether the first downsized image frame 740 of the third image pyramid 744 is before or after the first downsized image frame 720 of the first image pyramid 724, a horizontal pixel range (e.g., pixel width), a vertical pixel range, (e.g., pixel height) and/or a combination thereof.

As shown in FIG. 7, the alignment information for the tile 766 in the first downsized image frame 720 may identify the tile 786 in the first downsized image frame 740 that has the same location or position as the tile 766 in the first downsized image frame 720 (e.g., a co-located tile). The alignment information may also include an alignment vector 785 for identifying the matching patch 784 in the first downsized image frame 740 that is offset from the tile 786 in the first downsized image frame 740. As shown, the alignment vector 785 extends from a pixel in the lower left hand corner of the tile 786 with the head of the arrow pointing to a pixel in the lower left hand corner of the matching patch 784. In other implementations, the alignment vector 785 may extend from a pixel in the center of a co-located tile of the first downsized image frame 740 to a pixel in the center of the matching patch 784. The alignment vector 785 may be defined in any suitable way to identify the matching patch in an image frame. For example, the alignment vector 785 may include a horizontal component value (e.g., a row value) and a vertical component value (e.g. column value) (Vx, Vy)).

The alignment vectors determined between the image frames at the first level of the image pyramids may be upsampled or upsized to determine alignment vectors between the image frames in an immediate lower level of the image pyramids. For example, the alignment vectors between the first downsized image frames 720 and 740 in the first levels of the first and third image pyramids 724 and 744 may be upscaled or upsized and used to determine initial alignment vectors between the base image frame 710 and the second alternative image frame 714 (e.g. the first and third image frames 704 and 708) in the zeroth level or lowest level of the first and third image pyramids 724 and 744.

As shown in FIG. 7, the alignment vector 785 that identifies corresponding image data (e.g., a matching patch) in the first downsized image frame 740 may be upsampled or upsized for use in the zeroth level. The alignment vector may be upsized by a ratio or factor based on the difference in the sizes or resolutions of the image frames in the first and zeroth levels of the image pyramids. The upscaled or upsized alignment vectors may be used as a first initial alignment vectors (e.g., predicted vectors) for identifying positions or locations of first tile-sized areas in the second alternative image frame 714 (e.g., third image frame 708) to begin a search for image data that corresponds to the image data of a tile in the base image frame 710 (e.g., first image frame 704) of the first image pyramid 724. The positions of each of the first tile-sized areas may be shifted or moved horizontally and vertically in the first alternative image frame 714 by an offset (e.g., one or more pixels) to identify additional first tile-sized areas. The position of the first tile-sized areas may be moved or shifted any suitable number of times by an offset.

Further, the alignment vectors computed between the base image frame 710 and the first alternative image frame 712 (e.g., the first and second image frames 704 and 706) of the first and second image pyramids 724 and 734, respectfully, may be used to determine additional or second initial alignment vectors (e.g., prediction vectors) for identifying second tile-sized areas in the second alternative image frame 714 (e.g., the third image frame 708) of the third image pyramid 734. For example, the alignment vectors between the base image frame 710 and the first alternative image frame 710 may be used to compute second initial alignment vectors to identify second tile-size areas in the second alternative image frame 714 of the third image pyramid 744. The second initial alignment vectors for identifying the second tile-size areas in the second alternative image frame 714 may be determined based on the alignment vector $V_{m-1}$ (e.g., the alignment vector 778) for identifying the offsets between the candidate matching patches (e.g., matching patch 774) and selected tiles (e.g., tile 776) in the first alternative image frame 712. Further, in some implementations, the second initial alignment vectors may be computed based on a ratio of the temporal distance between a base image frame (e.g., the base image frame 710) and a first alternative image frame (e.g., the first alternative image frame 712) and the temporal distance between the base image frame (e.g., the base image frame 710) and a second alternative image frame (e.g., the second alternative image frame 714).

Assuming that the base image frame 710 (e.g., the first image frame 704) was captured at time 0, and the first and second alternative image frames 712 and 714 (e.g., the second and third image frames 706 and 708) were captured at time $-t_{m-1}$, $-t_{m-2}$, respectively, the temporal distance between the alternative image frames and the base image frame are $t_{m-1}$, $t_{m-2}$, respectively. When the image capture device capturing the image frames is still and an object moves at a constant speed in parallel to the image plane, the offsets in the alternative image frames may be proportional to the temporal distances between the image frames (e.g., a ratio of temporal distances between a base image frame and a first alternative image frame and the base image frame and a second alternative image frame). As such, the second initial alignment vector ($V_{m-2}$) for identifying the offset between a candidate matching patch and a reference tile in the second alternative frame 714 (e.g., third image frame 708) may be computed according to the equation described below.

$$V_{m-2} = \frac{t_{m-2}}{t_{m-1}} V_{m-1}$$

The second initial alignment vectors computed according to the equation above may be used to identify tile-sized areas in the second alternative image frame 714 of the third image pyramid 744. The tile-sized area may be shifted or moved horizontally and vertically in the second alternative image frame 714 by an offset (e.g., one or more pixels) to identify additional tile-sized areas to compare with the image data of the tile in the base image frame 710. The positions of the second tile-sized areas may be moved or shifted any suitable number of times by an offset.

For a third alternative image frame (not shown), a second initial alignment vector for identifying an offset between a tile-sized area (e.g., a candidate matching patch) and a tile in the third alternative image can be determined by one of the following equations:

$$V_{m-3} = \frac{t_{m-3}}{t_{m-2}} V_{m-2}$$

$$V_{m-3} = V_{m-2} + \frac{t_{m-3} - t_{m-2}}{t_{m-2} - t_{m-1}}(V_{m-2} - V_{m-1})$$

$$V_{m-3} = V_{m-2} + \left[\frac{V_{m-2} - V_{m-1}}{t_{m-2} - t_{m-1}} + \left(\frac{V_{m-2} - V_{m-1}}{t_{m-2} - t_{m-1}} - \frac{V_{m-1}}{t_{m-1}}\right) \cdot \frac{t_{m-3} - t_{m-2}}{2(t_{m-2} - t_{m-1})}\right](t_{m-3} - t_{m-2})$$

After identifying the tile-size areas in the second alternative image frame 714 (e.g., the third image frame 708), the image data associated with the tile-size areas may be compared to the image data associated with the tile in the base image frame 710. The comparison may be used to find the image data of the tile-sized areas that most closely matches the image data of the tile in the base image frame 710 of the first image pyramid 724. The tile in the base image frame 710 may correspond to a higher resolution or higher sized tile in the first downsized image frame 720 in the first image pyramid 724.

A matching error (e.g., a difference) may be measured or calculated between the image data of the tile in the base image frame 710 (e.g., the first image frame 704) and the image data of each of the tile-sized areas in the second alternative image frame 714 (e.g., the third image frame 708). The matching error may be calculated using any of the algorithms described above. The tile-size area having the lowest matching error may be selected as a matching patch.

In some implementations, the matching error may be compared to a threshold. For example, when the comparison of the matching error to a threshold value indicates that the image data (e.g., pixels) of the tile in the first image frame 704 and the image data of a tile-size area in the third image frame 708 are similar or substantially matching, the tile-size area may be selected as a candidate matching patch. For example, if the matching error is smaller than or equal to a threshold value (e.g., indicating that the pixels or image data is substantially similar), the tile-size area may be identified as a candidate matching patch.

Once the candidate matching patches are identified for the tile in the first image frame 708, the candidate matching patch that is most similar to the image data associated with the tile of the first image frame 704 may be selected as a matching patch (e.g., a best or closet matching patch). For example, the candidate matching patch that has the smallest matching error (e.g., minimum match error) may be selected as the matching patch. As shown in FIG. 7, a tile-size area 787 in the second alternative image frame 714 (e.g., the third image frame 708) may be identified and selected as the matching patch for the tile 772 in the base image frame 710 (e.g., the first image frame 704.

Once the matching patches are identified in the second alternative image frame 714 for each of the one or more tiles in the base image frame 710, alignment information (e.g., an alignment field or an alignment map) may be generated between the base image frame 710 and the second alternative image frame 714. The alignment information may include alignment vectors that identify the matching patches in the second alternative image frame 714. The alignment vectors may be two-dimensional vectors including horizontal component values (e.g., horizontal offsets) and vertical component values (e.g., vertical offsets). Each alignment vector may identify a different matching patch in the second alternative image frame 714.

In some implementations, the alignment information for a tile in the base image frame 710 may identify a location of a reference tile in the second alternative image frame 714 and may identify the location of the matching patch in the second alternative image frame 714. The reference tile identified in the second alternative image frame 714 may be co-located (e.g., in the same position) with the tile in the base image frame 710. For example, the tile of the second alternative image frame 714 may have the same coordinates, size, and shape as the tile in the base image frame 710 (e.g., co-located tile). Further, the alignment information may include an alignment vector that represents a displacement or offset between the matching patch and the reference tile identified in the second alternative image frame 714. The alignment information may also include resolution for the alignment vectors, a direction that identifies whether the third image frame 708 is before or after the first image frame 704, a horizontal pixel range (e.g., pixel width), a vertical pixel range, (e.g., pixel height) and/or a combination thereof.

As shown in FIG. 7, the alignment information for the tile 772 in the base image frame 710 (e.g., the first image frame 704) may identify a reference tile 788 in the second alternative image frame (e.g., the third image frame 708). The reference tile 788 may have the same location or position as the tile 772 in the base image frame 710 (e.g., the first image frame 704). The alignment information may also include an alignment vector for identifying a matching patch 787 in the second alternative image frame 714 that is offset from the reference tile 788 in the second alternative image frame 714. As shown in FIG. 7, the alignment vector extends from a pixel in the upper left hand corner of the reference tile 788 with the head of the arrow pointing to a pixel in the upper left hand corner of the matching patch 787. In other implementations, the alignment vector may extend from a pixel in the center of the reference tile 788 of the second alternative image frame 714 to a pixel in the center of the matching patch 787. The alignment vector may be defined in any suitable way to identify the matching patch 787 in the image frame. For example, the alignment vector may include a horizontal component value (e.g., a row value) and a vertical component value (e.g. column value) (Vx, Vy)).

The image data of the matching patches of the second alternative image frame 714 (e.g., the third image frame 708) may be merged with the image data of the tiles of the base image frame 71) (e.g., the first image frame 704) to form an output image frame or merged image frame. The output image frame may have improved characteristics over the individual image frames of the sequence of image frames. For example, the output image frame may have a greater resolution, a higher dynamic range, a larger depth of field, less noise, a higher sharpness level, and/or less blurring than any of the image frames in the image frame sequence.

Figure 8:
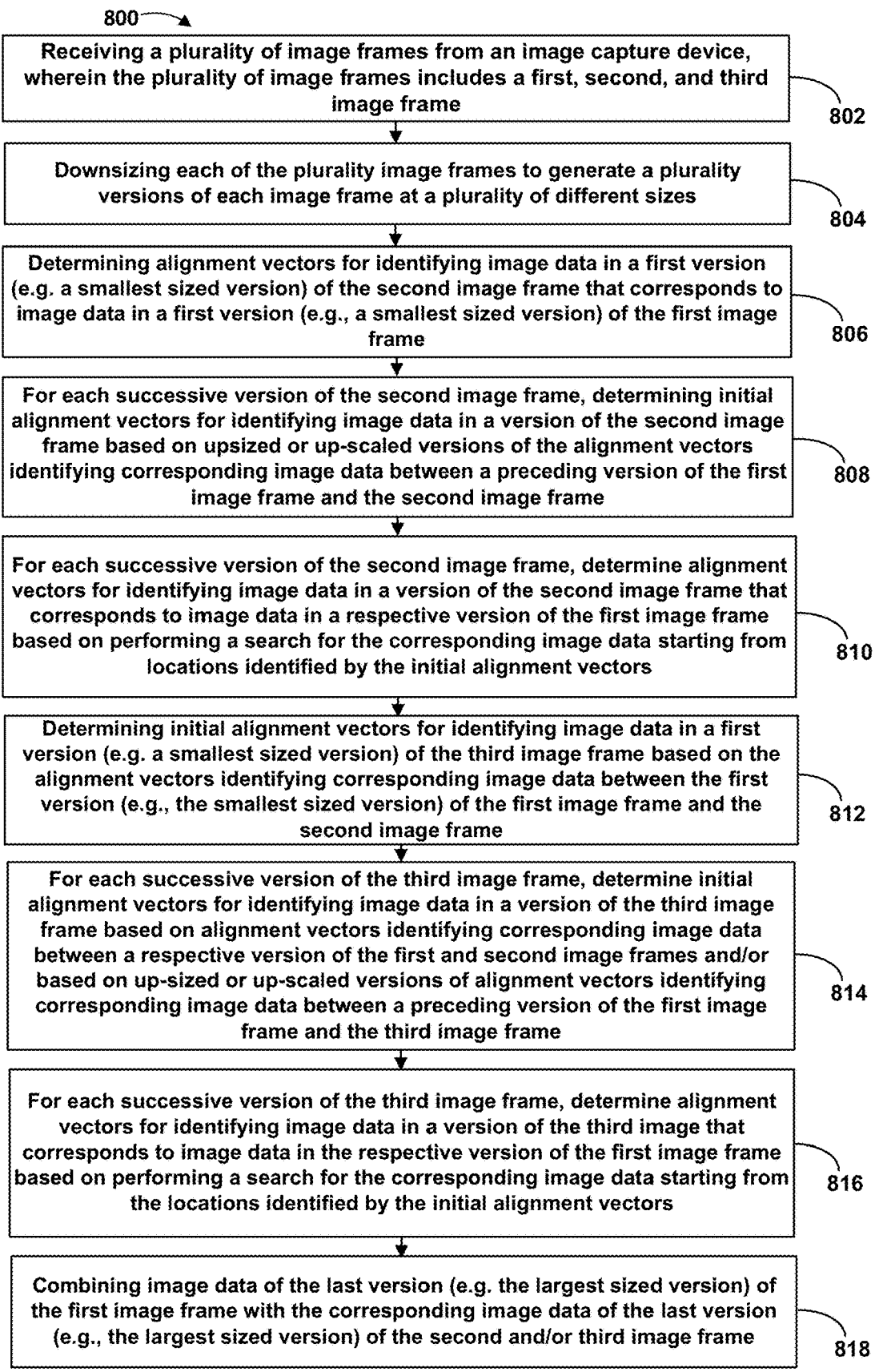
FIG. 8 is a flow chart of a method, according to an example implementation.

FIG. 8 is a flow chart of a method 800 for aligning image data of alternative image frames (e.g., images) with a base image frame, according to an example implementation. The method 800 represents an example method that may include one or more operations as depicted by one or more blocks 802-818, each of which may be carried out by any of the systems or processes as described in reference to FIGS. 1-7, among other possible systems. In an example implementation, a computing system or a sensor system (e.g., the sensor system 104, the control system 106, the remote computing system 302, the server computing system 306, the camera system 400, or the image capture device 402) may perform the illustrated operations, although in other implementations, one or more other systems can perform some or all of the operations.

Those skilled in the art will understand that the flow charts described herein illustrate functionality and operations of certain implementations of the present disclosure. In this regard, each block of the flow charts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is designed to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system or a sensor system (e.g., the remote computing system 302, the server computing system 306, the camera system 400, or the image capture device 402) may operate as shown by method 800. At block 802, the method 800 involves receiving a plurality of image frames from an image capture device. The plurality of image frames includes a first image frame, a second image frame, and a third image frame. The image capture device may capture image frames of a sequence of image frames during a burst sequence or payload burst. The sequence of image frames may be similar to the image frames described in reference to FIGS. 5 and 7.

The image frames of the sequence of image frames may be organized in a data stream and transmitted from the image capture device to a processor, such as the processor 406 of FIG. 4, and/or a memory, such as the system memory 404 of FIG. 4, for image processing. The processor may operate based on instructions, control information from registers, or both. The processor may divide the image frames into a number of tiles. For example, each of the image frames may be divided into an array of non-overlapping tiles having substantially the same shape and size. The image frames may include any number of tiles and each tile may include any number of pixels. In other implementations, the tiles of the image frames may have other shapes. Therefore, the present method is not limited in the number, size, and/or shape of the tiles that may be included in the image frames of the series of image frames.

One or more of the image frames of the sequence of image frames may be selected as a base or key image frame. The base frame may be selected or identified based on an aspect of an image, an aspect of the image capture device, and/or an aspect of a vehicle. In some examples, the base image frame may be selected from the image frames based on the capture or sampling times of the image capture device and/or the orientation of the image capture device relative to the vehicle or environment. For example, the computing device may select the image frame that is closest in time to a desired sample time or the last image frame in the sequence of image frames as the base image frame. In other examples, the computing device may select the base image frame from the sequence of image frames by identifying the image frame with the greatest sharpness, most contrast, and/or other image metric; or the image frame that was captured during the least amount of motion (e.g., based on metadata associated with each of the image frames and/or other data about the vehicles existing or planned motions); the image frame that was captured when the vehicle was at a certain location (e.g. a location with known static objects or known lighting conditions or known changes to lighting conditions); or the image frame that was capture when another vehicle sensor was in a certain state, e.g., a certain operating and/or orientation state.

The remaining image frames of the sequence of image frames 702. The remaining image frames may be designated as alternative or reference frames to be aligned with the base image frame. The alternative image frames may occur temporally before or after the base image frame (e.g., an adjacent image frame). As shown in FIG. 7, the first image frame 704 may be selected as the base image frame 710, the second image frame 706 may be designated as a first alternative image frame 712, and the third image frame 708 may be designated as a second alternative image frame 714.

At block 804, the method involves downsizing each of the plurality of image frames to generate a plurality of versions of each image frame at a plurality of different sizes. For example, the base image frame and the alternative image frames to be aligned may be downsized or down-sampled to produce versions of the base and alternative image frames at full resolution, half-resolution, and quarter-resolution. The base and alternative image frames may be down-sized in resolution a fixed number of times or a variable number of times depending on the size and/or resolution of the original image frames.

As shown in FIG. 7, the first image frame 704 (e.g., the base image frame 710) may be down-sized to generate a first downsized image frame 720 in a first level or layer 722 of a first image pyramid 724 and a second downsized image frame 726 in a second level 728 (e.g., highest level) of the first image pyramid 724. Similarly, the second image frame 706 (e.g., the first alternative image frame 712) may be downsized to generate a first downsized image frame 730 in a first level or layer 732 of a second image pyramid 734 and a second downsized image frame 736 in a second level 738 of the second image pyramid 734. Further, the third image frame 708 (e.g., the second alternative image frame 714) may be downsized to generate a first downsized image frame 740 in a first level or layer 742 of a third image pyramid 744 and a second downsized image 746 in a second level 748 of the third image pyramid 744. As shown, the second downsized image frame of each image pyramid may be the smallest image frame in the highest level of the image pyramid. The base image frame and the alternative image frames may be down-sampled fewer or more times than the example shown in FIG. 7.

At block 806, the method involves determining alignment vectors for identifying image data in a first version (e.g., a smallest sized image frame) of the second image frame that corresponds to image data in a first version (e.g., a smallest sized image frame) of the first image frame. The first image frame may proceed the second image frame. To illustrate, a tile 750 in the second downsized image frame 726 (e.g., highest downsized version) of the first image pyramid 724 may be selected and tile-sized areas of image data (e.g., pixels) in the second downsized image frame 736 (e.g., highest downsized version) of the second image pyramid 734 may be searched for corresponding or similar (e.g., substantially matching) image data, which may or may not be co-located or aligned with the tile 750 in the second downsized image frame 726 of the first image pyramid 724. After identifying one or more tile-size areas in the second downsized image frame 736 of the second image pyramid 734, the image data (e.g., pixels) of the identified tile-size areas may be compared to the image data of the tile 750 in the second downsized image frame 726 of the first image pyramid 724. A matching error (e.g., a difference) may be measured or calculated between the image data of the tile 750 of the second downsized image frame 726 and the image data of each identified tile-sized area in the second downsized image frame 736. The tile-size area having the lowest matching error may be selected as a matching patch for a tile in the first downsized image frame 726. As shown in FIG. 7, the tile-size area 764 may be identified and selected in the second downsized image frame 736 of the second image pyramid 734 as the matching patch for the tile 750 in the second downsized image frame 726.

Once the matching patches are identified in the second downsized image frame 736 of the second image pyramid 734 for each of the one or more tiles in the second downsized image frame 726 of the first image pyramid 724, alignment information (e.g., an alignment vector field or an alignment map) may be generated between the second downsized image frame 726 and the second downsized image frame 736. The alignment information may include alignment vectors (e.g., displacement vectors) for the one or more tiles in the second downsized image frame 726 to identify the corresponding matching patches in the second downsized image frame 736 of the second image pyramid 734. In some implementations, the alignment information for a tile in the second downsized image frame 726 of the first image pyramid 724 may identify a location of a reference tile in the second downsized image frame 736 and may identify a location of the matching patch in the second downsized image frame 736 of the second image pyramid 734. The reference tile identified in the second downsized image frame 736 of the second image pyramid 734 may be co-located (e.g., in the same position) with a tile in the second downsized image frame 726 of the first image pyramid 724. Further, the alignment information may include an alignment vector that represents displacements or offsets between the matching patch and the reference tile identified in the second downsized image frame 736 of the second image pyramid 734.

As shown in FIG. 7, the alignment information for the tile 750 in the second downsized image frame 726 may identify a co-located tile 762 in the second downsized image frame 736 of the second image pyramid 734 that has the same location or position as the tile 750 in the second downsized image frame 726 of the first image pyramid 724. The alignment information may also include an alignment vector 760 for identifying the matching patch 764 in the second downsized image frame 736 of the second image pyramid 734 that is offset from the co-located tile 762 in the second downsized image frame 736.

At block 808, the method involves, for each successive version of the second image frame, determining initial alignment vectors for identifying image data in a version of the second image frame based on upsized or up-scaled versions of the alignment vectors identifying corresponding image data between a preceding version of the first and second image frame. Alignment information may be determined between each version of the first and second image frames. To illustrate, the alignment vectors determined between the second downsized image frames 726 and 736 at the highest level (e.g., the second level) of the first and second image pyramids 724 and 734 may be upscaled or upsized for use to determine alignment vectors between the image frames in an immediate lower level (e.g., the first level) of the image pyramids. The alignment vectors may be upsized by a ratio or factor based on the difference in sizes of the image frames in the first and second levels of the image pyramids. The upscaled or upsized alignment vectors may be used as initial alignment vectors (e.g., predicted vectors) for identifying positions or locations of tile-sized areas in the downsized image frame of the lower level (e.g., the first level) of the second image pyramid to begin a search for image data that corresponds to the image data of one or more tiles in the downsized image frame of the lower level of the first image pyramid 724. The process described above will be repeated between the image frames for each lower level of the first and second image pyramids.

As block 810, the method involves, for each successive version of the second image frame, determining alignment vectors for identifying image data in a version of the second image frame that corresponds to image data in a respective version of the first image frame based on performing a search for the corresponding image data starting from locations identified by the initial alignment vectors. Alignment information may be determined between each version of the first and second image frame. To illustrate, the position of each of the tile-sized areas identified by the initial alignment vectors in the first downsized image frame 730 of the second image pyramid 734 may be shifted or moved horizontally and vertically in the first downsized image frame 730 by an offset (e.g., one or more pixels) to identify additional tile-sized areas for searching. After determining the tile-size areas in the first downsized image frame 730, the image data of the identified tile-size areas may be compared to the image data of a tile in the first downsized image frame 720 of the first image pyramid 724 to identify the tile-sized area in the first downsized image frame 730 that most closely matches (e.g., matching patches) the selected tile in the first downsized image frame 720. Based on the comparisons, the tile-sized area that is most similar to the image data of the tile in the first downsized image frame 720 of the first image pyramid 724 may be selected as a matching patch (e.g., a best or closest matching patch). As shown in FIG. 7, a tile-size area 768 in the first downsized image frame 730 of the second image frame 734 may be identified and selected as the matching patch.

Once the matching patches are identified in the first downsized image frame 730 of the second image pyramid 734 for one or more tiles in the first downsized image frame 720 of first image pyramid 724, alignment information (e.g., an alignment vector field or an alignment map) may be generated between the first downsized image frame 720 and the first downsized image frame 730. The alignment information may include alignment vectors (e.g., displacement vectors) that identify the matching patches in the first downsized image frame 730 of the second image pyramid 734 for the one or more tiles in the first downsized image frame 720. In some implementations, the alignment information for a tile in the first downsized image frame 720 of the first image pyramid 724 may include an alignment vector for identifying a location of a reference tile in the first downsized image frame 730 of the second image pyramid 734 and for identifying the location of the matching patch in the first downsized image frame 730. The reference tile identified in the first downsized image frame 730 may be co-located (e.g., in the same position) with the tile in the first downsized image frame 720 of the first image pyramid 724. Further, the alignment vector may represent a displacement or offset between the matching patch and the reference tile identified in the first downsized image frame 730 of the second image pyramid 734.

As shown in FIG. 7, the alignment information for the tile 766 in the first downsized image frame 720 may identify the co-located tile 770 in the first downsized image frame 730 of the second image pyramid 734 that has the same location or position (e.g., a co-located tile) as the tile 766 in the first downsized image frame 720. The alignment information may also include the alignment vector 769 for identifying the matching patch 768 in the first downsized image frame 730 of the second image pyramid 734 that is offset from the tile 770 in the first downsized image frame 730. The process described above may be repeated for each version of the second image frame (e.g., at each level) to determine alignment vectors for identifying image data in each version of the second image pyramid that corresponds to image data in a respective version of the first image pyramid.

At block 812, the method involves determining initial alignment vectors for identifying image data in a first version (e.g., a smallest sized version) of the third image frame based on the alignment vectors identifying corresponding image data between the first version (e.g., the smallest sized version) of the first image frame and the second image frame. To illustrate, alignment vectors may be determined for identifying image data of tile-sized areas in the highest version of the downsized image frames of the third image pyramid 744 that corresponds or is similar to (e.g., substantially match) the image data of one or more tiles in the highest version of the downsized image frames of the first image pyramid.

A search may be performed to find image data of tile-sized areas in the highest version of the downsized image frame (e.g., the second downsized image frames) of the third image pyramid 744 that may correspond to or match the image data of one or more tiles in the highest version of the downsized image frames of the first image pyramid 724. To identify tile-sized areas in the downsized image frames, the alignment vectors between the highest version of the downsized image frames of the first and second image pyramids 724 and 744 may be used to determine initial alignment vectors (e.g., predicted vectors) for identifying tile-sized areas in the highest version of the downsized image frame 746 of the third image pyramid 744. In some implementations, the initial alignment vectors for identifying the tile-sized areas in the highest version of the downsized image frame 746 may be determined based on the alignment vectors between the highest versions of the image frames (e.g., the second downsized image frames 726 and 736) of the first and second image pyramids. Further, the alignment vectors may be determined based on the temporal distances between image frames. For example, in some implementations, the alignment vectors may be scaled based on a ratio of temporal distances between a base image frame (e.g., the first image frame 704) and a first alternative image frame (e.g., the second image frame 706) and the base image frame (e.g., the first image frame 704) and a second alternative image frame (e.g., the third image frame 708). The initial alignment vectors may be computed according to the equations as described above.

Each initial alignment vector may identify a position of a tile-size area in the highest version of the downsized image frame (e.g., the second downsized image frame 746) of the third image pyramid 744. The position of each of the tile-sized areas identified by the initial alignment vectors in the downsized image frame may be shifted or moved horizontally and vertically in the downsized image frame by an offset (e.g., one or more pixels) to identify additional tile-sized areas. After determining the tile-size areas in the highest version of the downsized image frame of the third image pyramid, the image data of the identified tile-size areas may be compared to the image data of a tile in the highest version of the downsized image frames (e.g., the first downsized image frame 726) of the first image pyramid 724 to find the tile-sized areas in the highest version of the down-sized image frame that most closely match the tile in the highest version of the downsized image frame of the first image pyramid 724. Based on the comparisons, the tile-size area that is most similar to the image data of the tile in the highest version of the downsized image frame of the first image pyramid may be selected as the matching patch (e.g., a best or closest matching patch). As shown in FIG. 7, a tile-size area 783 in the second downsized image frame 746 of the third image pyramid 744 may be identified and selected as the matching patch.

Once the matching patches are identified in the highest version (e.g., the second downsized image frame 746) of the third image pyramid 744 for one or more tiles in the highest version of the downsized image frame of the first image pyramid 724, alignment information (e.g., an alignment vector field or an alignment map) may be generated between the downsized image frame of the first pyramid and the downsized image frame of the third pyramid. The alignment information may include alignment vectors that identify the matching patches in the downsized image frame of the third image pyramid 744. In some implementations, the alignment information for a tile in the downsized image frame of the first image pyramid 724 may identify a location of a reference tile in the downsized image frame of the third image pyramid 744 and may identify the location of the matching patch in the downsized image frame of the third image pyramid. The reference tile identified in the downsized image frame of the third image pyramid 744 may be co-located (e.g., in the same position) with the tile in the downsized image frame of the first image pyramid 724. The reference tile of the second downsized image frame of the third image pyramid may have the same coordinates, size, and shape as the tile of the downsized image frame of the first image pyramid 724. The alignment information may include an alignment vector that represents a displacement or offset between the matching patch in the downsized image frame of the first image pyramid 724 and the co-located tile in the downsized image frame of the third pyramid 744.

As shown in FIG. 7, the alignment information for the tile 750 in the second downsized image frame 726 (e.g., the highest downsized image frame) may identified a co-located tile 782 in the second downsized image frame 746 (e.g., the highest downsized image frame) of the third image pyramid 744 that has the same location or position as the tile 750 in the second downsized image frame 726 of the first image pyramid 724. The alignment information may also include an alignment vector 780 for identifying a matching patch 783 in the second downsized image frame 746 that is offset from the tile 782 identified in the second downsized image frame 746.

At block 814, the method involves, for each successive version of the third image frame, determine initial alignment vectors for identifying image data in a version of the third image frame based on alignment vectors identifying corresponding image data between a respective version of the first and second image frames and/or based on upsized or up-scaled versions of the alignment vectors identifying corresponding image data between a preceding version of the first image frame and the third image frame. Alignment information may be determined between each version of the first and third image frames. To illustrate, the alignment vectors between the second downsized image frames 726 and 746 of the second level (e.g., highest level) in the first and third image pyramids 724 and 744 may be upscaled or upsized and used to determine alignment vectors between the first downsized image frames 720 and 740. For example, the alignment vectors that identify corresponding image data (e.g., a matching patch) in the second downsized image frames 746 in the second level may be up-sampled for use in the first level of the image pyramids. The upscaled or upsized alignment vectors may be used as initial alignment vectors (e.g., predicted vectors) for identifying positions or locations of first tile-sized areas in the first downsized image frame 740 to begin a search for image data that corresponds to the image data of a tile in the first downsized image frame 720 of the first image pyramid 724. The positions of each of the first tile-sized areas may be shifted or moved horizontally and vertically in the first downsized image frame 740 by an offset (e.g., one or more pixels) to identify additional tile-sized areas.

Further, the alignment vectors computed between the first downsized image frames of the first and second image pyramids 724 may be used to determine additional or second initial alignment vectors (e.g., predicted vectors) for identifying tile-size areas in the first downsized image frame 740 of the third image pyramid 744. For example, the alignment vectors between the first downsized image frames 720 and 730 may be used to compute the second initial alignment vectors between the first downsized image frames 720 and 740 of the first and third image pyramids 724 and 744. As such, the second initial alignment vectors may be determined based on the alignment vectors between the first downsized image frame 720 and 730. Further, in some implementations, the second initial alignment vectors may be scaled based on a ratio of the temporal distances between the image frames. For example, the second initial alignment vectors may be scaled based on a ratio of the temporal distances between the first image frame 704 (e.g., the base image frame 710) and the second image frame 706 (e.g., the first alternative image frame 712) and the first image frame 704 and the third image frame 708 (e.g., the second alternative image frame 714). The second initial alignment vectors may be computed according to the equations as described above.

Each second initial alignment vector may identify a position of a second tile-size area in the first downsized image frame 740 of the third image pyramid 744 to begin a search for image data that corresponds to the image data of a tile in the first downsized image frame 720. The position of the second tile-sized areas may be shifted or moved horizontally and vertically in the first downsized image frame 740 by an offset (e.g., one or more pixels) to identify additional second tile-sized areas.

After identifying the first and second tile-size areas in the first downsized image frame 740 of the third image pyramid 744, the image data associated with the tile-size areas in the first downsized image frame 740 may be compared to the image data associated with the tile in the first downsized image frame 720 of the first image pyramid 724. The comparison may be used to find positions of the tile-sized areas in the first downsized image frame 740 that most closely matches the tile in the first downsized image frame 720 of the first image pyramid 724.

Based on the comparisons, the tile-sized areas that are most similar to the image data of the tiles in the first downsized image frame 720 may be selected as matching patches (e.g., a best or closest matching patch). For example, the tile-sized area that has a smallest matching error (e.g., minimum match error) may be selected as the matching patch for the tile in the first downsized image frame 720. As shown in FIG. 7, a tile-size area 784 in the first downsized image frame 740 may be identified and selected as a matching patch.

Once the matching patches are identified in the first downsized image frame 740 for one or more tiles in the first downsized image frame 720 of the first image pyramid 724, alignment information (e.g., an alignment vector field or an alignment map) may be generated between the first downsized image frame 720 and the first downsized image frame 740. The alignment information may include alignment vectors that identify the matching patches in the first downsized image frame 740 for the tiles in the first downsized image frame 720. In some implementations, the alignment information for the one or more tiles in the first downsized image frame 720 of the first image pyramid 724 may identify a location of a reference tile in the first downsized image frame 740 of the third image pyramid 744 and may identify the location of the matching patch in the first downsized image frame 740. The reference tile identified in the first downsized image frame 740 may be co-located (e.g., in the same position) with the tile in the first downsized image frame 720. For example, the reference tile of the first downsized image frame 740 may have the same coordinates, size, and shape as the tile in the first downsized image frame 720. Further, the alignment information may include an alignment vector that represents displacements or offsets between the matching patches and the associated co-located tile identified in the first downsized image frame 740.

As shown in FIG. 7, the alignment information for the tile 766 in the first downsized image frame 720 may identify a co-located tile 786 in the first downsized image frame 740 that has the same location or position as the tile 766 in the first downsized image frame 720. The alignment information may also include an alignment vector 785 for identifying a matching patch 784 in the first downsized image frame 740 that is offset from the tile 786 in the first downsized image frame 740. The process described above may be repeated to determine initial alignment vectors for each version of the third image frame.

At block 816, the method involves, for each successive version of the third image frame, determine alignment vectors for identifying image data in a version of the third image frame that corresponds to image data in the respective version of the first image frame based on performing a search for the corresponding image data starting from the locations identified by initial alignment vectors. Alignment information may be determined between each version of the first and third image frames. To illustrate, after identifying the tile-size areas in the third image frame, the image data associated with the tile-size areas may be compared to the image data associated with a tile in the first image frame. The comparison may be used to find the image data of the tile-sized area that most closely matches the image data of the tile in the first image frame of the first image pyramid. Based on the comparisons, the candidate matching patches that are most similar to the image data associated with the tile of the first image frame may be selected as the matching patches (e.g., the best or closest matching patches). As shown in FIG. 7, a tile-size area 787 in the third image frame 708 may be identified and selected as the matching patch.

Once the matching patches are identified in the third image frame for one or more tiles in the first image frame 704, alignment information (e.g., an alignment vector field or an alignment map) may be generated between the first image frame and the third image frame. The alignment information may include alignment vectors that identify the matching patches in the third image frame. In some implementations, the alignment information for the one or more tiles in the first image frame may identify a location of a reference tile in the third image frame and may identify the location of the matching patch in the third image frame. The reference tile identified in the alternative image frame may be co-located (e.g., in the same position) with the tile in the first image frame. The alignment information may also include an alignment vector that represents a displacement or offset between the matching patch and the reference tile identified in the alternative image frames.

As shown in FIG. 7, the alignment information for the tile 772 in the first image frame may identify a co-located tile in the third image frame that has the same location or position as the tile 772 in the first image frame 704. The alignment information may also include an alignment vector for identifying a matching patch in the third image frame that is offset from the co-located tile in the third image frame. The process is repeated between each of the corresponding versions of the first and third image frames.

At block 818, the method involves combining image data of the last version (e.g., the largest sized version) of the first image frame with the corresponding image data of the last version (e.g., the largest sized image frame) of the second and/or third image frames. The image data associated with each of the tiles of the first image frame may be combined with the corresponding image data (e.g., matching image data) of the second and/or third image frame to form an output or combine image frame. The output image frame may have improved characteristics over the individual image frames of the sequence of image frames. For example, the output image frame may have a greater resolution, a higher dynamic range, a larger depth of field, less noise, a higher sharpness level, and/or less blurring than any of the individual images in the image sequence.

In some implementations, the systems of the vehicle may utilize the resulting output image frame as input to control the path of the vehicle in an environment and/or to make a determination about the location and identity of objects in the surrounding environment. For example, the vehicle system may compare a sequence of captured images with the output image frames to determine changes in positions of the vehicle. By utilizing the output image frames, the system may make estimates of the position of the vehicle that is bounded in error, from output image frame to output image frame. Further, the output image frames may be useful for a number of applications including depth estimation, three-dimensional reconstruction, refocusing, high dynamic range imaging, and the like.

Figure 9:
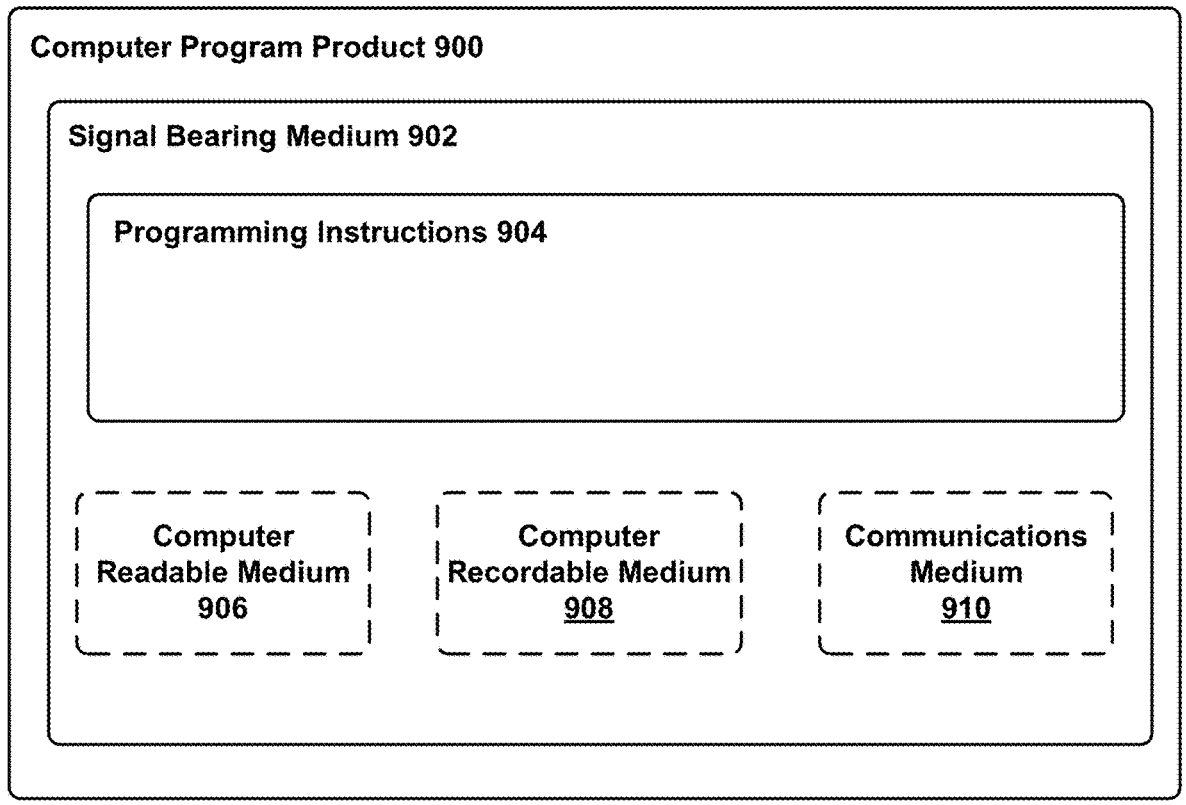
FIG. 9 is a schematic diagram of a computer program, according to an example implementation.

FIG. 9 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 900 is provided using signal bearing medium 902, which may include one or more programming instructions 904 that, when executed by one or more processors may provide functionality or portions of the functionality described above with respect to FIGS. 1-7. In some examples, the signal bearing medium 902 may encompass a non-transitory computer-readable medium 906, such as, but not limited to, a hard disk drive, a CD, a DVD, a digital tape, memory, components to store remotely (e.g., on the cloud), etc. In some implementations, the signal bearing medium 902 may encompass a communication medium (e.g., a fiber optic cable, a waveguide, a wired communications link, a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog wireless communication link, etc.). Similarly, the signal bearing medium 902 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, by a processor, a plurality of image frames from an image capture device;
   downsizing each of the plurality of image frames to generate a plurality of versions of each image frame at a plurality of different sizes;
   determining alignment information for a first version of a first image frame, the alignment information including a first alignment vector for identifying image data in a first version of a second image frame that corresponds to image data in the first version of the first image frame; and
   determining a first initial alignment vector for identifying image data in a first version of a third image frame based on at least the first alignment vector.

2. The method of claim 1, wherein the first initial alignment vector represents an offset between a first and second region in the first version of the third image frame, wherein the first region in the first version of the third image frame is co-located with a first region in the first version of the first image frame.

3. The method of claim 1, wherein determining the first initial alignment vector further comprises scaling the first alignment vector.

4. The method of claim 1, wherein determining the first initial alignment vector further comprises scaling the first alignment vector based on a ratio of a temporal distance between the first and third image frames and a temporal distance between the first and second image frames.

5. The method of claim 1, wherein the versions of each of the first, second, and third image frames forms an image pyramid structure, wherein each image pyramid structure comprises a plurality of pyramid levels ranging from a lowest level to a highest level, wherein the first version of the first image frames comprises a smallest sized version of the first image frame, wherein the first image frame comprises a base image frame, and wherein each of the second and third image frames comprise an alternative image frame.

6. The method of claim 1, further comprising determining alignment vectors between each version of the first image frame and an associated version of the second image frame based on upsized alignment vectors between a smaller sized version of the first and second image frames.

7. The method of claim 1, further comprising:
   identifying a first region in the first version of the third image frame using the first initial alignment vector;
   searching one or more regions in the first version of the third image frame starting with the first region identified by the first initial alignment vector;
   determining matching errors based on comparisons between image data of each of the one or more regions in the first version of the third image frame to image data of a first region in the first version of the first image frame;
   selecting a region from the one or more regions in the first version of the third image frame based on the matching errors; and
   generating a second alignment vector for identifying the selected region in the first version of the third image frame.

8. The method of claim 7, wherein the selected region identified by the second alignment vector includes image data that corresponds to image data of the first region in the first version of the first image frame, wherein the second alignment vector represents an offset between a reference region and the selected region in the first version of the third image frame, and wherein the reference region in the first version of the third image frame is co-located with the first region in the first version of the first image frame.

9. The method of claim 7, wherein determining the matching errors further comprises calculating at least one of a summed absolute difference, a mean square error, a normalized cross correlation, a Lucus-Kanade based estimation, a deep learning method, a loss function, a number of significant pixels, or a combination thereof.

10. The method of claim 1, further comprising:
    upsizing the first alignment vector;
    identifying a first region in a second version of the second image frame using the upsized first alignment vector;
    searching one or more regions in the second version of the second image frame starting with the first region identified by the upsized first alignment vector;
    determining matching errors based on comparisons of image data of each of the one or more regions in the second version of the second image frame to image data of a first region in a second version of the first image frame;
    selecting a region from the one or more regions based on the matching errors; and
    generating a second alignment vector for identifying the selected region in the second version of the second image frame, wherein the image data of the selected region corresponds to the image data of the first region in the second version of the first image frame.

11. The method of claim 10, further comprising determining a second initial alignment vector for identifying image data in the second version of a third image frame based on at least the second alignment vector, and wherein determining the second initial alignment vector is further based on a temporal distance between the first and second image frames and a temporal distance between the first and the third image frames.

12. The method of claim 11, further comprising:
    identifying a first region in the second version of the third image frame using the second initial alignment vector;
    searching one or more regions in the second version of the third image frame starting with the first region in the second version of the third image frame;
    determining matching errors based on comparisons of image data of each of the one or more regions in the second version of the third image frame to image data of the first region in the second version of the first image frame;

selecting a region from the one or more regions in the second version of the third image frame based on the matching error; and generating a third alignment vector for identifying the selected region in the second version of the third image, where the image data of the selected region corresponds to the image data of the first region in the second version of the first image frame.

13. The method of claim 7, further comprising:

upsizing the second alignment vector;

identifying a first region in a second version of the third image frame using the upsized second alignment vector;

searching one or more regions in a second version of the third image frame starting with the first region identified by the upsized second alignment vector;

determining matching errors based on comparisons of image data of each of the one or more regions of the second version of the third image frame to image data of a first region in a second version of the first image frame;

selecting a region from the one or more regions in the second version of the third image frame based on the matching errors; and generating a third alignment vector for identifying the selected region in the second version of the third image frame, wherein the image data of the selected region corresponds to the image data of the first region in the second version of the first image frame.

14. The method of claim 1, further comprising:

identifying a first region in a largest sized version of the third image frame using an upsized second alignment vector between a smaller sized version of the first image frame and the third image frame;

searching one or more regions in the largest sized version of the third image frame starting with the first region identified by the upsized alignment vector;

determining matching errors based on comparisons of image data of each of the one or more regions in the largest sized version of the third image frame to image data of a first region in the largest sized version of the first image frame;

selecting a region from the one or more regions in the largest sized version of third image frame based on the matching error; and generating a second alignment vector for identifying the selected region in the largest sized version of the third image frame, wherein the image data of the selected region corresponds to the image data of the first region in the largest sized version of the first image frame.

15. The method of claim 14, further comprising combining at least a portion of the image data of the selected region in the largest sized version of the third image frame with at least a portion of the image data of the first region in the largest sized version of the first image frame.

16. The method of claim 14, further comprising determining a second initial alignment vector for identifying a region in the largest sized version of the third image frame based on at least an alignment vector between the largest sized version of the first image frame and the largest sized version of the second image frame, and wherein determining the second initial alignment vector is further based on a temporal distance between the largest sized versions of the first and second image frames and a temporal distance between the largest sized versions of the first and second image frames.

17. An apparatus comprising:

a memory for storing image frames;

at least one processor configured to:

receive a plurality of image frames from an image capture device;

downsize each of the plurality image frames to generate a plurality versions of each image frame at a plurality of different sizes;

determine alignment information for a first version of a first image frame, the alignment information including a first alignment vector for identifying image data in a first version of a second image frame that corresponds to image data in the first version of the first image frame; and determine a first initial alignment vector for identifying image data in a first version of a third image frame based on at least the first alignment vector.

18. A method for processing images captured from a vehicle comprising:

receiving a burst of images captured by an image capture device mounted to a vehicle, wherein an object captured in the burst of images changes position during an image capture duration of the burst;

identifying within the burst a base image and a plurality of alternative images;

merging image data of the object in the plurality of alternative images with the base image based on alignment information comprising:

an upscaled alignment vector computed based on a first downsized version of a first alternative image and a first downsized version of the base image and a temporal distance scaled alignment vector computed between a second downsized version of the first alternative image and a second downsized version of the base image.

19. The method of claim 18, wherein identifying the base image is based on an aspect of an image frame, an aspect of the image capture device, or an aspect of the vehicle.

20. The method of claim 18, wherein the first downsized version is a smaller size than the second downsized version.

* * * * *